(12) United States Patent
Van Zijst

(10) Patent No.: US 7,733,868 B2
(45) Date of Patent: Jun. 8, 2010

(54) LAYERED MULTICAST AND FAIR BANDWIDTH ALLOCATION AND PACKET PRIORITIZATION

(75) Inventor: Erik Van Zijst, Amstelveen (NL)

(73) Assignee: Internet Broadcasting Corp., Oost (NL)

( * ) Notice: Subject to any disclaimer, the term of this patent is extended or adjusted under 35 U.S.C. 154(b) by 340 days.

(21) Appl. No.: 11/342,167

(22) Filed: Jan. 26, 2006

(65) Prior Publication Data

US 2006/0268871 A1 Nov. 30, 2006

Related U.S. Application Data

(60) Provisional application No. 60/647,601, filed on Jan. 26, 2005.

(51) Int. Cl.
*H04L 12/28* (2006.01)
*H04L 12/56* (2006.01)
*H04J 3/16* (2006.01)
*H04J 3/22* (2006.01)

(52) U.S. Cl. ...................... 370/394; 370/465

(58) Field of Classification Search ......... 370/229–231, 370/235, 238, 389, 394, 428, 468, 469, 477, 370/390, 430–432
See application file for complete search history.

(56) References Cited

U.S. PATENT DOCUMENTS

| | | | |
|---|---|---|---|
| 4,799,215 A * | 1/1989 | Suzuki | 370/227 |
| 5,095,480 A | 3/1992 | Fenner | |
| 5,331,637 A | 7/1994 | Francis et al. | |
| 5,596,574 A | 1/1997 | Perlman et al. | |
| 5,842,224 A | 11/1998 | Fenner | |
| 5,860,136 A | 1/1999 | Fenner | |
| 6,222,841 B1 * | 4/2001 | Taniguchi | 370/389 |
| 6,330,238 B1 | 12/2001 | Ooe | |
| 6,347,090 B1 | 2/2002 | Ooms et al. | |
| 6,496,477 B1 | 12/2002 | Perkins et al. | |
| 6,577,609 B2 | 6/2003 | Sharony | |
| 6,691,192 B2 | 2/2004 | Ajanovic et al. | |

(Continued)

FOREIGN PATENT DOCUMENTS

WO    WO-2004010250    1/2004

OTHER PUBLICATIONS

J. Byers, et al., "FLID-DL: Congestion Control for Layered Multicast." in Proceedings NGC 2000, Nov. 2000, 11 p. 11.

(Continued)

*Primary Examiner*—Kevin C Harper
*Assistant Examiner*—Xavier Szewai Wong
(74) *Attorney, Agent, or Firm*—Perkins Coie LLP

(57) ABSTRACT

Embodiments include an overlay multicast network. The overlay multicast network may provide a set of features to ensure reliable and timely arrival of multicast data. The embodiments include a congestion control system that may prioritize designated layers of data within a data stream over other layers of the same data stream. Each data stream transmitted over the network may be given an equal share of the bandwidth. Addressing in routing tables maintained by routers may utilize summarized addressing based on the difference in location of the router and destination address. Summarization levels may be adjusted to minimize travel distances for packets in the network. Data from high priority data stream layers may also be retransmitted upon request from a destination machine to ensure reliable delivery of data.

18 Claims, 12 Drawing Sheets

1001 — {0(9,2,6); 1(9,3,6); 2(9,3,7); 1(9,4,7); 2(9,4,8); 0(10,4,8); 2(10,4,9); 1(10,5,9)}

1003 — {0(9,2,6); 0(10,4,8); 2(9,3,7); 1(9,3,6); 1(10,5,9); 2(10,4,9)}

1005

| 0(9,2,6) | 0(10,4,8) | |
|---|---|---|
| 1(9,3,6) | | 1(10,5,9) |
| 2(9,3,7) | | 2(10,4,9) |

1007

| 0(9,2,6) | 0(10,4,8) | |
|---|---|---|
| 1(9,3,6) | 1(9,4,7) | 1(10,5,9) |
| 2(9,3,7) | | 2(10,4,9) |

1009 — {0(9,2,6); 1(9,3,6); 1(9,4,7); 0(10,4,8); 1(10,5,9)}

U.S. PATENT DOCUMENTS

| | | | |
|---|---|---|---|
| 6,757,294 | B1 | 6/2004 | Maruyama |
| 6,845,105 | B1 | 1/2005 | Olsson et al. |
| 6,904,015 | B1* | 6/2005 | Chen et al. ............... 370/235 |
| 6,917,984 | B1* | 7/2005 | Tan ............................ 709/238 |
| 7,076,569 | B1* | 7/2006 | Bailey et al. ............... 709/250 |
| 7,085,691 | B2* | 8/2006 | Riess et al. ..................... 703/2 |
| 2001/0014103 | A1* | 8/2001 | Burns et al. ................ 370/429 |
| 2001/0048662 | A1 | 12/2001 | Suzuki et al. |
| 2002/0028687 | A1* | 3/2002 | Sato et al. .................. 455/466 |
| 2002/0114282 | A1 | 8/2002 | MeLampy et al. |
| 2002/0118692 | A1* | 8/2002 | Oberman et al. ........... 370/419 |
| 2002/0120769 | A1 | 8/2002 | Ammitzboell |
| 2002/0126671 | A1 | 9/2002 | Ellis et al. |
| 2002/0143951 | A1 | 10/2002 | Khan et al. |
| 2002/0176406 | A1 | 11/2002 | Tsukada et al. |
| 2002/0191631 | A1 | 12/2002 | Couty |
| 2003/0026268 | A1 | 2/2003 | Navas |
| 2003/0035424 | A1 | 2/2003 | Abdollahi et al. |
| 2003/0035425 | A1 | 2/2003 | Abdollahi et al. |
| 2003/0037132 | A1 | 2/2003 | Abdollahi et al. |
| 2003/0041171 | A1 | 2/2003 | Kobayashi |
| 2003/0046425 | A1 | 3/2003 | Lee |
| 2003/0123438 | A1 | 7/2003 | Li et al. |
| 2003/0123453 | A1 | 7/2003 | Ooghe et al. |
| 2003/0123479 | A1 | 7/2003 | Lee et al. |
| 2003/0133406 | A1 | 7/2003 | Fawaz et al. |
| 2003/0161311 | A1 | 8/2003 | Hiironniemi |
| 2003/0202513 | A1 | 10/2003 | Chen et al. |
| 2003/0212816 | A1 | 11/2003 | Bender et al. |
| 2003/0233464 | A1* | 12/2003 | Walpole et al. ............. 709/231 |
| 2004/0010616 | A1 | 1/2004 | McCanne |
| 2004/0015591 | A1 | 1/2004 | Wang |
| 2004/0052251 | A1 | 3/2004 | Mehrotra et al. |
| 2004/0081197 | A1 | 4/2004 | Liu |
| 2004/0133631 | A1 | 7/2004 | Hagen et al. |
| 2004/0133697 | A1 | 7/2004 | Mamaghani et al. |
| 2004/0165536 | A1 | 8/2004 | Xu et al. |
| 2004/0202164 | A1 | 10/2004 | Hooper et al. |
| 2004/0258002 | A1 | 12/2004 | Tran et al. |
| 2004/0258094 | A1 | 12/2004 | Bashan et al. |
| 2005/0002363 | A1 | 1/2005 | Cheng et al. |
| 2005/0102414 | A1* | 5/2005 | Hares et al. ................. 709/232 |
| 2005/0190693 | A1* | 9/2005 | Jinzaki et al. ............... 370/229 |
| 2006/0015624 | A1* | 1/2006 | Smith et al. ................. 709/227 |
| 2006/0085828 | A1* | 4/2006 | Dureau et al. ............... 725/100 |
| 2006/0164987 | A1* | 7/2006 | Ruiz Floriach et al. ...... 370/235 |
| 2007/0121507 | A1* | 5/2007 | Manzalini et al. ........... 370/235 |
| 2007/0206592 | A1* | 9/2007 | Itakura et al. ............... 370/389 |

OTHER PUBLICATIONS

Y. D. Chawathe,, "Scattercast: An Architecture for Internet Broadcast Distribution as an Infrastructure Service," Dissertation for the Degree of Philosophy, Fall 2000, 161 Page, Berkeley, California, USA.

Chang, C. et al., "A Loop-Free Extended Bellman-Ford Routing Protocol Without Councing Effect", ACM 089791-332-9/89/0009/0224, pp. 227, 228 section 3.2. Year: 1989.

International Search Report PCT/US2006/002995 dated Aug. 29, 2008, 5 pages.

Sergey Gorinsky, et al., "The Utility of Feedback in Layered Multicast Congestion Control," NOSSDAV'01, Jun. 25-26, 2001, Port Jefferson, New York, USA, pp. 93-102.

S. McCanne, et al., "Receiver-Driven Layered Multicast," Proceedings of ACM SIGCOMM '96, Oct. 1996. pp. 1-14, Standford, California, USA.

Supratim Deb, et al., "Congestion Control for Fair Resource Allocation in Networks With Fulticas Flows," IEEE/ACM Transactions on Networking, pp. 274-285, vol. 12, No. 2, Apr. 2004, IEEE.

Sergey Gorinsky, et al., "Addressing Herterogeneity and Scalability in Layered Multicast Congestion Control," Technical Report TR2000-31, Nov. 24, 2000, pp. 1-12, Austin, Texas, USA.

G.V. Chockler, et al., "An Adaptive Totally Ordered Multicast Protocol that Tolerates Partitions," pp. 237-246, ACM Press Institute of Computer Science, The Hebrew University of Jerusalem, Israel, May 1998 Technical Report CS 98-4.

Dah Ming Chiu, et al., "TRAM: A Tree-based Reliable Multicast Protocol," SML Technical Report Series, p. 24 Sun Microsystems, Inc. SML TR-98-66, Chelmsford, Massachusetts, USA, Jul. 1998.

Lorenzo Vicisano, et al., "TCP-like Congestion Control for Layered Multicast Data Transfer," In Proceedings of INFOCOM '98, Mar. 1998, 8 Pages.

Xue Li, et al., "Layered Video Mutlicast with Retransmission (LVMR): Evaluation of Error Recovery Schemes," http://citeseer.ist.psu.edu/155541.html, 12 Pages, Atlanta, Georgia, USA, 1998.

* cited by examiner

ROUTING TABLE OF NODE S2.C

| DEST | HOP | COST |
|------|------|------|
| S2.C | —    | 0    |
| S2.A | S2.A | 1    |
| S2.B | S2.B | 1    |
| S1.* | S1.R | 1    |
| S3.* | S3.X | 1    |

| 0(9,2,6) | 0(10,4,8) |          |
|----------|-----------|----------|
| 1(9,3,6) |           | 1(10,5,9)|
| 2(9,3,7) |           | 2(10,4,9)|

1007

| 0(9,2,6) | 0(10,4,8) |          |
|----------|-----------|----------|
| 1(9,3,6) | 1(9,4,7)  | 1(10,5,9)|
| 2(9,3,7) |           | 2(10,4,9)|

1009 —{{0(9,2,6); 1(9,3,6); 2(9,3,7); 1(9,4,7); 0(10,4,8); 1(10,5,9)}}

LAYERED MULTICAST AND FAIR BANDWIDTH ALLOCATION AND PACKET PRIORITIZATION

CROSS-REFERENCE TO RELATED APPLICATION

This application is based upon and claims priority to U.S. Provisional Application No. 60/647,601, filed Jan. 26, 2005, which is incorporated by reference as if set forth in full herein.

FIELD OF THE INVENTION

The invention relates to network management. Specifically, the invention relates to the management of data packets to support multicasting.

BACKGROUND

Despite the versatility in digital communication, interoperability and internationally accepted communication protocols of the Internet, its fundamental design has not changed much since its conception and does not excel in everything. Watching live TV for example is something which is not typically done over the Internet, even though television has been around almost twice as long as the Internet Protocol and represents a huge market. The reasons for this are based on the design of the Internet and Internet Protocol (IP).

The Internet is a packet-switching network where data is exchanged in small units or packets that are independently transported over the network and concatenated again at the receiver into its original form. A strength of packet-switching is that it allows for very flexible use of the physical network wires. When two communicating parties have no data to exchange for a certain period of time, no packets are sent and the wires can carry packets from other parties. On the Internet, bandwidth is not reserved, but available to and shared by everyone. The consequence is that it cannot guarantee a minimum amount of end-to-end bandwidth, making live video streams often appear jerky because frames are skipped due to congestion that delays or prevents delivery.

Even though with help from specialized protocols such as Distance Vector Multicase Routing Protocol (DVMRP) or Protocol Independent Multicast (PIM), the Internet Protocol allows for data packets to be multicast to a large number of receivers simultaneously, using this feature to successfully realize a live video broadcast is a challenge. A video stream is transmitted at a fixed high rate and not all parts of the network are likely to have sufficient bandwidth available to forward the stream.

When a bandwidth bottleneck is reached, the router discards the packets that cannot immediately be forwarded. This causes two problems. The data stream that is eventually received by one or more receivers further down the network is corrupt and the congestion also has a negative impact on communication sessions of other nodes that communicate through the bottleneck router. The only way to avoid this problem using the Internet Protocol and standard multicast is to find a transmission rate that is supported by all parts of the network. However, since the network is available to anyone, this rate will continuously change. A transmission rate is selected and the packet loss is accepted. However, when packets are dropped randomly by overloaded routers the data stream will suffer packet loss. If additional packets are sent through the bottleneck router, there is a larger chance that the router will choose one of these packets when ready to send another packet, implicitly rewarding heavy streams during congestion. This encourages sending redundant data thereby exacerbating the problem.

A more fundamental problem of flow control using the Internet Protocol is that slowing down the data may not be an option for certain types of live data streams. However, packet loss is unavoidable using the Internet Protocol and while data types such as audio and video data can usually withstand some packet loss without becoming too corrupted to play, this does not apply to all types of live data. Real-time financial data, for example, will become useless and even dangerous to use if random packets of trades are lost.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this discussion are not necessarily to the same embodiment, and such references mean at least one.

FIG. 10 is a diagram that shows the process of selective packet repair and ordering.

DETAILED DESCRIPTION

Figure 1:
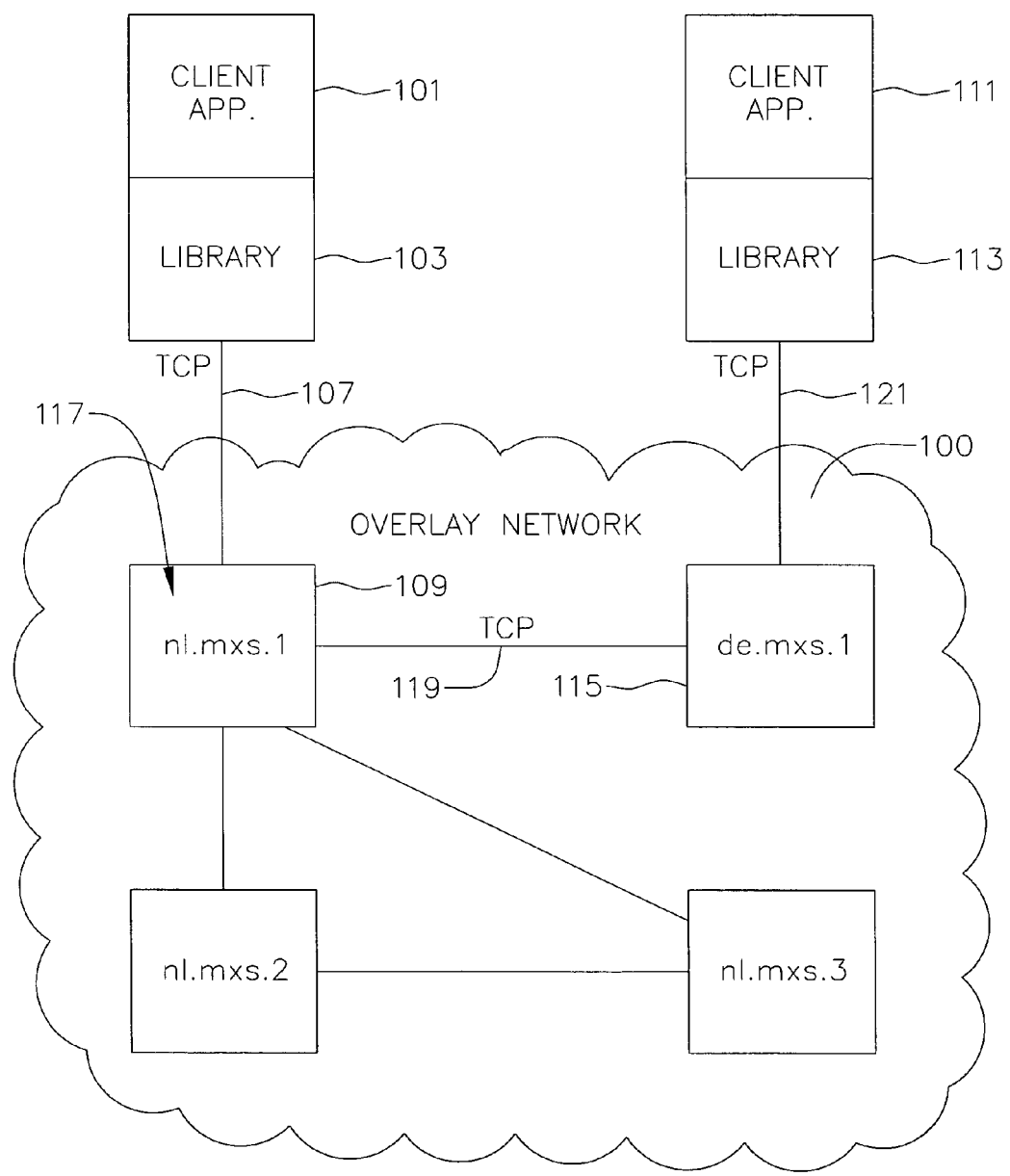
FIG. 1 is a diagram of one embodiment of an overlay multicast network.

To provide multicast services a network needs to support one-to-many communication that can send data packets from a data source to more than one receiver, ideally without putting extra stress on the network or source when the number of receivers increases. Multicast routing can be offered by different methods. One method is to let receivers tell the network, but not necessarily the source, which data streams they want to receive and let the network compute data distribution paths that deliver just the right packets to each receiver. Multicasting can also be done by letting the source encode the list of receivers in each data packet, thereby freeing the network from the potentially computationally intensive task of maintaining multicast distribution paths. However, this method does not scale to handle a large number of receivers. A third method relies on logic at the receivers by letting the network apply a broadcast mechanism whereby each packet is delivered to every connected node and letting the receivers filter out only those packets that are interesting. This method may also generate a heavy load on a larger network but it is simple.

In one embodiment, a multicast network is constructed as an overlay network. In one embodiment, the overlay network includes a number of software implemented routers connected by normal IP or TCP connections. A mesh is created in which every software router is connected to one or more other software routers by means of virtual connections that appear to be direct connections to the other software routers, but are likely implemented by a number of intervening traditional TCP/IP routers situated between the software routers. Two routers that are connected this way, are adjacent in the perspective of the overlay, but in reality are many physical hops away from one another. Also, a software router that has three software router neighbors has three independent virtual links. However, it is possible that this software router only has a single physical network connection that is shared by the three virtual links.

To the underlying network, the overlay network is nothing more than a collection of applications that send data between static pairs. Beyond each router pair (identifiable by their TCP connection) there is no relation between the individual daemons. As such, the overlay network can easily work through firewalls, NAT (IP masquerading), proxies and VPN's. Firewalls cannot control which software router POPs can talk to each other. The system shares some principals with a HTTP proxy server tunneling traffic to and from web browsers. In an example HTTP proxy server system, an intranet has two web browser machines. They both browse the Internet using the proxy server also on the local intranet. Although the individual web browser machines can surf the net individually, they never make a direct connection with a remote webserver, but only with the local proxy server that acts like a relay point. As such, the firewall that sits between the proxy server and the remote webserver can only choose to either allow the proxy server to talk to the webserver or deny it. It is generally unable to enforce unique policies for individual browser machines. It generally cannot tell on behalf of which client the proxy server is fetching a webpage. Returning to the overlay network, because each software router is a relay point that tunnels data traffic for different senders and receivers similar to a HTTP proxy server, firewalls have no fine-grained control over communication over the overlay network. As soon as a firewall allows for only a single TCP connection between an internal and an external POP, all software routers connected to the internal one can talk to all POPs connected to the external one, and vice versa, without restriction.

In one embodiment, the overlay multicast routing system also manages flow control and timely delivery. Non interactive live data streams do not actively anticipate network congestion. To manage congestion the network manages the available bandwidth to allow for fair or equal division among the streams. Without management, high volume streams are assigned a larger capacity percentage on overloaded links resulting in little benefit in keeping the bandwidth requirements of a stream low, as the packet loss percentage is determined by how much the network is overloaded by all streams combined and not by the requirements of the individual streams. An alternative to letting the network handle the flow control and congestion is to put the responsibility at the source and receivers. However, letting data streams anticipate network conditions requires a form of feedback information from the network or the receivers. In this case it is beneficial that the amount of feedback does not grow linearly with the size of the audience, as that would reduce the scalability of the multicast. Even when a scalable form of feedback information can be realized and the data stream adapts its transmission rate according to the network conditions, the problem remains that live streams loose their value when they are slowed down and delivered late.

In one embodiment, an overlay multicast system also implements or manages delivery of packets including an option for guaranteed delivery. It would be ideal if every receiver would receive the data stream without loss or corruption. However, when the content is 'live' and cannot be slowed down, but the network has insufficient capacity, packet loss is difficult to avoid. In fact, even when there is sufficient bandwidth at all times, store-and-forward packet-switched networks are not able to guarantee the delivery of all packets. For example, when a router crashes, all packets in its buffers may be irrecoverably lost. If a network uses dynamic routing, packets are also dropped when routing policies change or packets are trapped in an occasional, temporary routing loop. In cases where packets are 'accidentally' lost, an end-to-end mechanism of retransmissions can be applied that can compensate for the loss. However, since this requires a form of feedback information, it is beneficial for reasons of scalability that the overhead involved with retransmissions is not linearly related to the size of the audience.

End-to-end retransmission feedback may be avoided in at least two ways. First, it is possible to let the network components keep a copy of the most recently forwarded packets and let them participate in retransmissions by intercepting the retransmission requests and servicing them locally. This approach often utilizes greater storage and increased processing power requirements at the network components.

The second alternative to end-to-end retransmission requests is that of encoding redundant information in the data packets. If enough redundancy is encoded, a lost packet's content may be entirely recovered from the extra information in the other packets. The downside of this system is that it comes with a constant level of bandwidth overhead that is related to the level of packet loss tolerance, regardless of whether packets are actually lost. Each of these approaches to packet loss fail in the case of a live data stream that produces more bytes than the network can forward. When local or end-to-end retransmission requests are used, the problem may even be increased as the retransmission requests use extra bandwidth, causing more data packets to be lost.

Embodiments of the overlay multicast system are designed to offer an end-to-end solution to efficiently multicast live data including stock market data to any machine connected to the Internet. The system is capable of giving certain hard guarantees over what is delivered to receivers. If packets must be dropped due to congestion or other irrecoverable problems, it is done in a fully deterministic way that does not corrupt the data. Where a receiver of data such as a viewer of a film may accept the random loss of one or two video frames, this type of data loss may wreak havoc in financial data when the missed packet contains an important trade. The system supports deterministically delivery designated parts of a data stream when the network lacks sufficient capacity. The system utilizes a layered multicast with data streams subdivided into individual streams or layers. This allows receivers to subscribe to only those layers that the network can handle, so that random packet loss can largely be avoided.

In another embodiment, an enhanced form of layered multicast is used that guarantees complete delivery for certain layers to avoid random loss altogether, making it suitable for certain types of critical data such as market data. The system is characterized as controlling two primary activities. The first activity is running and managing a robust and scalable overlay network that uses its own routing algorithms and supports multicast, while the second activity is managing flow control and congestion when live streams overload the network and ensuring layered multicast can be offered with guarantees.

FIG. 1 is a diagram of one example embodiment of an overlay multicast system. In one embodiment, the system includes an overlay network 100 that includes a number of software router daemons 109, 115, that are interconnected by normal TCP connections 119 or similar reliable communication connections. The overlay multicast system forms an intricate web of routers and virtual links similar to the Internet, but operating on the application layer. This system operating at the application layer 'overlays' the physical network and other layers of the Internet providing its own system of routing, controlling the lower levels of the network. Any number or routers and client applications may be a part of the system. In the example, two of the routers 109, 115 are in communication with local client applications 101, 111.

In one embodiment, each of the routers have a unique, string-based addresses 117. In another embodiment, the routers may have other types of unique addresses such as numerical addresses. Each of the router daemons 109, 115 executes a routing algorithm that computes the shortest paths that allows each router to send data packets to any other router in the overlay multicast system as well as any machine in communication with these routers.

In one embodiment, the system includes a runtime client library 103, 113, application programming interface (API) or similar system for sending and receiving packets that can be utilized by user applications to communicate over the system. This library connects an application to a nearby system router daemon 109, 115 through a TCP connection 107, 121, native inter-process communication or similar communication method. The native inter-process communication method may be used if both the router and the client application run on the same physical machine. When connected to a router daemon, the client application 101, 111 can send and receive data packets from the network under the router's unique address. Router daemons have a unique address, while user applications connected to a router daemon are identified through logical ports.

In one embodiment, the topology of the overlay network may be configured at router daemon startup. The topology may be relatively static after configuration. In one embodiment, the relationship of router daemons to applications may be one to many, with a single router daemon serving multiple applications. In another embodiment, the relationship may be many to many.

In one embodiment, the data packets in the overlay network may be addressed to a single communication endpoint or to abstract multicast addresses. Single communication endpoints are network address used by user applications. Access to them is exclusive such that only one user application can use them for sending and receiving packets at a time.

In one embodiment, a unique network address in the overlay network that is used by an application is the combination of a logical node address assigned to the overlay router and the port name chosen by the application. If an application that is connected to a overlay router with the logical node address "n1.msx.1" wants to use a port named "myport" for receiving unicast data packets, the fully qualified network address becomes "n1.mxs.1.:myport." Other applications connected to the overlay network that want to send packets to this application can use this as a destination address. Ports may be referred to as tports. Overlay network addresses must be bound, prior to sending or receiving packets. When a data packet is sent from an endpoint address it will contain this information as its source, allowing other routers or the receiving application to send a response.

In one embodiment, the overlay network may support packets being sent to abstract multipoint destinations, or multicast addresses. An overlay network multicast address is a destination that each machine on the network may subscribe to. The overlay network software routers ensure that a copy of each data packet published to this multicast address is delivered to every user application that subscribed to it. In one embodiment, multipoint destinations are single sourced. Only one application can publish data packets to the multicast address, making the overlay network suitable for one to many, but not many to many communications. Because a tport session of a multicast address can be freely chosen, each multicast address explicitly contains the location of the source on the overlay network. This makes multicast communication less flexible because publishing is not anonymous, but it greatly simplifies subscription management. In another embodiment, multiple applications may publish to a multicast address and many to many communication is supported.

In one embodiment, both unicast and multicast addresses are syntactically equal. For example, the address "n1.mxs.1:timeserice" could be a unicast address used and bound by an application that provides the local date and time in response to any data packet it receives. However, it could also be a multicast address that anyone can subscribe to. For example, subscription to the address may provide periodic date and time broadcasts from the user application that bound this address as a multicast address. In one embodiment, each packet may contain a flag or similar indicator that indicates whether its destination address should be interpreted as a unicast or multicast address.

In one embodiment, the overlay network provides a set of higher layered protocols as services over the packet oriented base layer. These services may be referred to as protocol endpoints. Any number of protocol endpoints may be defined and supported. In one embodiment, five protocol endpoints may be supported. A unreliable unicast protocol (UUP), a reliable unicast protocol (RUP), unreliable multicast protocol (UMP), ordered layered multicast protocol (OLMP) and reliable ordered layered multicast protocol (ROLMP) may be supported. The UUP offers a best effort unicast datagram service to applications. The RUP offers reliable unicast communication between peers. The UMP offers best effort multicast datagram services to applications on the overlay network. The OLMP offers multicast communication with receiver driven rate control. Complete delivery is not guaranteed, but the packets that are received are guaranteed to be in their original order. The ROLMP offers reliable multicast communication with receiver driven rate control. Stream layering allows each subscriber to receive the data stream in the highest possible quality, while the source never has to slow down.

Figure 2:
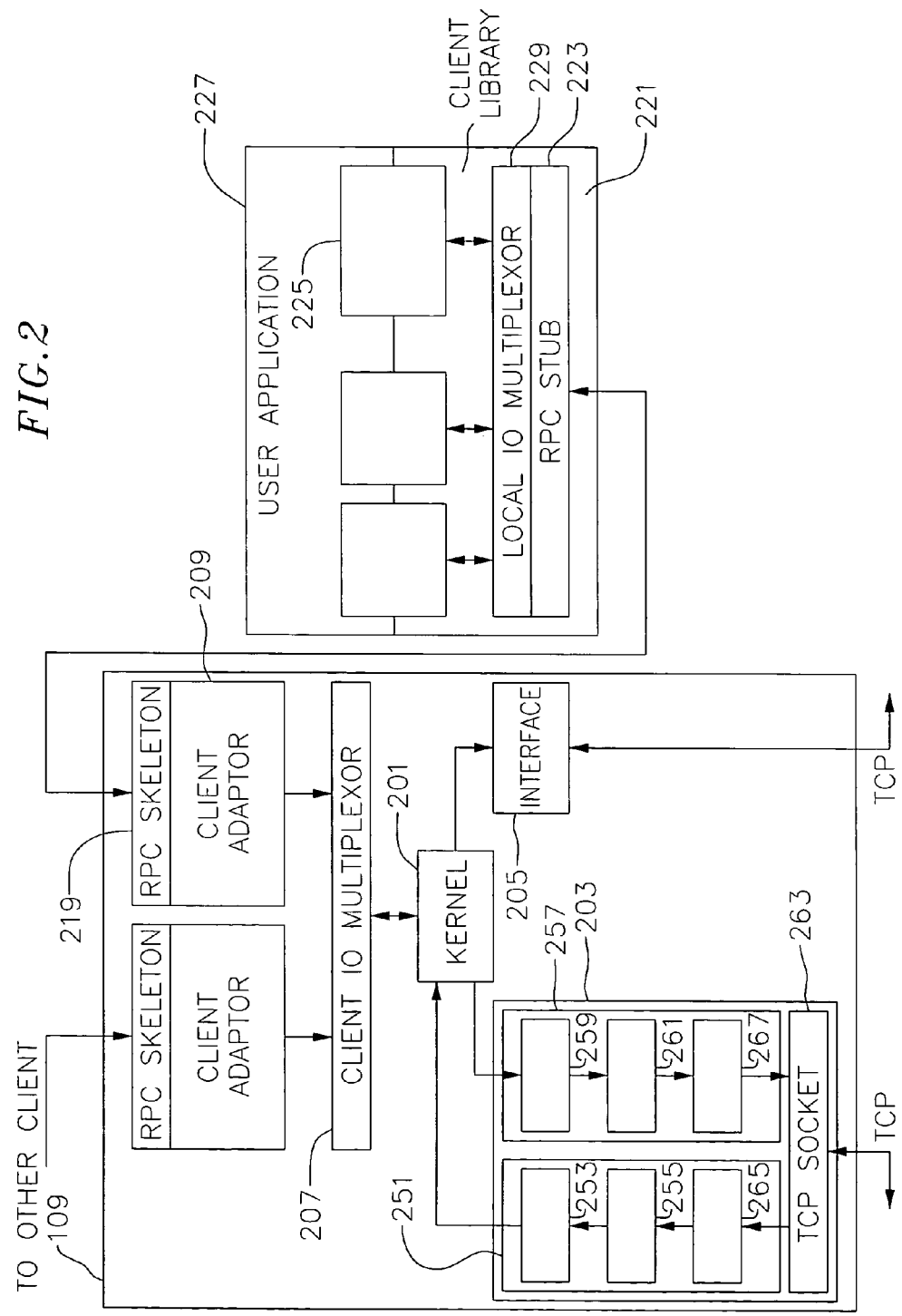
FIG. 2 is a diagram of one embodiment of the basic components of a router daemon in the overlay multicast system.

FIG. 2 is a diagram of one embodiment of the basic components of a router daemon in the overlay multicast system. Each overlay network router 109 includes a packet switching core or kernel 201. In one embodiment, packets that are received, either from a connection to a neighbor router or from a connected application, pass through the kernel 201. The kernel 201 may not handle some specialized control packets. The task of the kernel 201 is to inspect the destination of each packet and use a set of routing tables to determine how to forward the packet.

In one embodiment, the kernel 201 forwards packets to neighbors through a set of interface modules 203, 205. In one embodiment, the kernel 201 may execute on its own thread and be event driven. The kernel 201 remains idle until it is notified by an interface module 203, 205 of an incoming packet or by an application 227 that is sending a packet. The kernel thread is woken up, reads the packet from the interface module or application and processes it. If the kernel decides that the packet must be sent out through an interface, it passes it to that interface and waits for the next notification.

In one embodiment, each router daemon in the network is connected to one or more neighbors. This is done by establishing connections between the routers. In one embodiment, the connections may be long lived TCP connections or similar communication connections. In one embodiment, a router daemon 109 runs one interface module 203, 205 instance for each configured neighbor or configured communication channel. In another embodiment, the router 109 may run multiple interface modules for a configured neighbor or communication channel or a single interface module for multiple configured neighbors or communication channels. The responsibility of an interface module 203, 205 is to establish a connection, e.g., a TCP connection, and to pass packets from the kernel 201 to the connection and vice versa. Packets of the first kind are referred to as outbound packets, while the latter are inbound packets.

In one embodiment, the kernel 201 maintains a unicast routing table that is used for packet switching. To make it possible for the network to find shortest paths as well as adjusting these paths when the underlying physical network's characteristics change, each interface module may measure the quality of its virtual connection. These measurements are passed on to the kernel 201 when the link quality is found to have changed. Inside the kernel 201, the measurements may be fed to a routing algorithm to determine if the changed link quality alters any of the entries in the routing table. If the routing table is changed, it is advertised to the neighbors by encoding the entire table or a portion of the table in a data packet and passing it to each interface. In one embodiment, if this type of packet is received from a neighbor and propagated to the kernel 201 through the receiving interface, the kernel inspects the message and analyzes it through the routing algorithm. If the new information leads to changes in routing entries, the router sends its own related routing entries to all its neighbors.

In one embodiment, if a neighbor router crashes, the interface detects this through an error on the virtual link and passes an indicator to the routing algorithm. The routing algorithm then changes the cost indication associated with the link to an infinite value or similar value indicating that the link should not be utilized. In one embodiment, the kernel 201 does not distinguish between a crashed neighbor and an infinitely slow link. The kernel 201 only detects that the link is not to be utilized when reading the entry in the routing table.

In one example, when a source application connected to router S wants to publish a live data stream to multicast group s:mygroup, where applications on node p and q want to receive it, the source may first bind the group in publish-mode. Binding a multicast group in publish-mode means that the group is owned by the binding process. Only the owner of the group is able to publish to it. The receiving or "sink" applications connected to routers p and q now bind group s:mygroup in subscribe-mode. Binding a multicast group in subscribe-mode results in the router node being connected to a virtual multicast distribution tree. The subscribers receive a copy of any packet published by the source.

In one embodiment, multicast groups do not necessarily need to be bound in publish-mode first. Any application may subscribe to any multicast group at any time. If there is no source, there will be no data to receive. Binding a multicast group either in publish-mode or subscribe-mode are distinct operations. When the source also wants to receive a copy of its own stream, it binds its group in subscribe-mode and uses the resulting tsocket to read the data back. Data packets carry both the address of their source application, as well as the network address of their destination.

For unicast packets, the router uses its unicast routing table to find the preferred next hop, while multicast packets are routed according to a subscription list in a multicast subscription table. In one embodiment, a unicast data packet contains the node address of the source router, the tport of the source application, the address of the destination router and the tport of the destination application. A multicast data packet contains the multicast group it was published to, represented by the node address of the source router and the group identifier that was bound by the source application. It does not contain any other addressing information.

In one embodiment, the overlay multicast system determines unicast routing tables and multicast subscription tables for each router. The system utilizes any type of routing algorithms or protocols to determine routing tables. Protocols that are utilized include distance-vector protocols and link-state protocols. Link-state protocols take the relatively simple approach of propagating the state of the entire network as a list of all known links in the network with their cost. Distance-vector protocols are based on the Bellman-Ford protocol. They work by letting every router periodically advertise its own routing table to its neighbors. In one embodiment, the Extended Bellman-Ford protocol, hereafter referred to as ExBF, is used as the basis of the overlay multicast network. For sake of convenience, the embodiments of overlay multicast system are described that utilize the ExBF, however, those of ordinary skill in the art would understand that other routing algorithms may also be utilized.

In the ExBF protocol, a slight increase in the amount of information is kept for every destination. Instead of storing just the distance to each destination for every neighbor, ExBF also stores the address of the pre-final node of each path. Hence, instead of storing the collection of distances $\{D_i(j)\}$ where j represents a destination, D the distance between this node and j, while i ranges over the node's neighbors, each router also stores $\{P_i(j)\}$ where P is the pre-final, or so-called 'head-of-path' node in the shortest path to destination j. Now because the router knows the pre-final node of every destination, it can backtrack the full path to any destination by recursively looking at the head-of-path of a destination and treating it as a new destination.

In one embodiment, the interface modules 203, 205 implement a simple algorithm to establish the communication connection to the neighbor machine or device. The interface module 203, 205 attempts to connect to the configured neighbor router by actively trying to connect to its network address, e.g., its TCP/IP network address. If the connection is aborted with a connection refused or other error, it is assumed that the neighbor is not yet running and the interface module 203, 205 starts to listen on its configured IP port so that the neighbor can connect to it when it is started up. The interface module 203, 205 waits for an incoming connection request for a brief period of time. After this time period expires, the interface module 203, 205 returns to actively connecting to its neighbor. To avoid a situation where both neighbors continue to switch between the listen and active states at the same time, the duration of the listening state is influenced by a random factor. An advantage of allowing each neighbor to switch between the active connection and listening states when establishing a connection is that it allows the connection of routers even if one of the routers is on a masqueraded IP network. A router on a masqueraded IP network is unable to accept incoming connections such as TCP connections.

In one embodiment, interface modules 203, 205 can be configured at router deployment through configuration files. This will make the router daemon automatically create the specified interfaces at startup. If the configured neighbor routers are online, all long-lived connections will automatically be established. It is also possible to add new neighbor connections and interface module instances dynamically at runtime. This way the overlay network topology can be changed flexibly and new routers can be added to the network. If an interface module 203, 205 manages to establish a connection with a neighbor router, the interface modules of the routers exchange overlay network node address information to inform each other of their presence. When the interface module 203, 205 receives the node address of its neighbor, it passes this information, together with an announcement that a connection has been made to the kernel 201. This information allows the kernel routing algorithms to build dynamic routing tables.

In one embodiment, a role of the interface modules 203, 205 is to establish the connection with a configured neighbor router and to send data packets from the router kernel 201 to the neighbor connection and vice versa. The interface module 203, 205 incorporates a framework that allows custom software plug-ins to influence the stream of packets that flows between the network and the kernel 201. This mechanism is referred to as the interceptor pipeline 251, 257. In one embodiment, each software plug in component that needs to control the packet flow is a class that implements a simple programming interface. In another embodiment, the software plug ins may have any implementation structure including objected oriented structures. This interface allows interceptor instances to be chained together, forming a packet processing pipeline. The contract of an interceptor is that it receives a packet, applies it operations and then passes the modified packet to the next interceptor in the chain.

In one embodiment, an interceptor pipeline 251, 257 sits between the router switching core and the network connection. When the router kernel 201 delivers a packet to the interface module 203, 205 for transmission to the neighbor router, the interface module runs the packet through the interceptor pipeline, giving the interceptors the chance to modify the packet. Each packet that comes out of the pipeline is transmitted to the neighbor router.

In one embodiment, each interface module 203, 205 has two interceptor pipelines 251, 257. The first interceptor pipeline 257 is used to process outbound packets. The second interceptor pipeline 251 is used for inbound packets. These pipelines are independent of one another, the ordering of the interceptors and the number of processing steps can be different for inbound and outbound packets. Each pipeline can be configured uniquely. Interceptor pipelines may have any number of interceptors, provided they do not add too much latency.

In one embodiment, an example of an interceptor is one that filters packets from a specific overlay network router. When this interceptor is implemented as a manageable component that can be configured dynamically at runtime, it can be used to implement basic firewall functionality on the overlay network. If it receives a packet that matches its rejection pattern, it discards the packet by not passing it to the next interceptor in the pipeline. Another type of interceptor that may be used is a traffic monitor that counts the size of each packet that passes by and uses this to log traffic activity and compute bandwidth statistics. This plug in mechanism allows an overlay network router to be extended with additional functionality without modifications to the underlying software.

In one embodiment, the interceptor pipelines 251, 257 act as a packet buffer between the router kernel 201 and the network. The interface modules 203, 205 temporarily buffer inbound and outbound packets. This ensures that the kernel 201 is not blocked when sending a packet to an interface. In one embodiment, the interface modules have a separate thread or set of threads that continuously dequeue and serialize packets from the buffer and write them to the communication connection or enqueue into a buffer received packets.

In one embodiment, the interceptor pipeline provides a temporary packet buffer and offers inter-thread communication between the kernel thread and the interface thread. Interceptors may be divided into two categories: interceptors that block and interceptors that return immediately. The first category is referred to as blocking or synchronous interceptors. In one embodiment, to avoid situations where a router kernel 201 is blocked for an arbitrarily long time, an interceptor pipeline may contain one non-blocking interceptor. A non-blocking interceptor guarantees immediate return of control to a caller by storing the packet in an internal buffer. The packets in the buffer may be discarded if the buffer exceeds a certain threshold size.

In one embodiment, a maximum size limit is placed on the packet buffers to prevent them from exhausting the router's memory. Storing packets before processing them means that their delivery will be delayed. The larger the buffer gets, the longer the packets are delayed. Because of this, the interceptor drops packets when the buffer reaches its maximum size. In one embodiment, the system uses reliable TCP or similar connections for transmitting packets between routers in which packets are only dropped inside the buffer interceptors of the interface modules.

In one embodiment, the interceptor plays a role in making packet loss deterministic. Packets are not explicitly dropped in any other part of the layered multicast system network, except the buffer interceptor in the interface pipelines. However, that may not guarantee that a packet that successfully makes it through all buffer interceptors of the network's routers is delivered at its destination. Aside from controllable packet loss, the network may also occasionally lose packets in a non-deterministic way, for example when a router crashes with pending packets in its buffers, or when a connection between adjacent routers is unexpectedly closed during transmission of a packet.

In one example, an inbound interceptor pipeline 251 may be structured such that traffic throughput monitor interceptors 253 are positioned after a buffer interceptor 255 and a firewall interceptor 265 may be positioned before for the buffer interceptor 255. In an example outbound interceptor pipeline 257, a throughput limiting interceptor 259 may be positioned before a buffer interceptor 261 and a traffic monitor interceptor 267 may be positioned after the buffer interceptor 261.

In one embodiment, the overlay network is accessible to applications through the use of the client-side programming library 221. This library connects to a router daemon 109 at application startup and communicates with it using remote procedure protocol or similar communication protocols. The communication between the library 221 and the router daemon 109 is driven by the application 227. The application 227 invokes functions in the router 109 through the library 221. In one embodiment, when the kernel 201 receives packets addressed to a tport that is bound by the application 227, it stores them until the client actively picks them up. The application 227 through the library 221 continuously polls the router for packets. To minimize the overhead of the polling mechanism, the router poll function does not return until there is at least one packet delivered by the kernel 201. If more than one packet is waiting, the poll function returns all waiting packets at the time it is invoked. In another embodiment, the router may send an indication such as an invoking a marshaled stub from the client, event notification or similar indicator to the application 227 through the library 221 to indicate the reception of a data packet for the application 227.

In one embodiment, a user application 227 uses a client library 221 through instances of the overlay multicast system communication sockets 225. If a user wants to be able to receive packets, they reserve a network address. In one embodiment, a network address in the overlay multicast system is represented as a combination of the address of the router and a unique port identifier, reserved for the socket of the router. For sake of convenience, a port in the layered multicast system will be referred to as a tport and a socket as a tsocket. When a user application creates a tsocket for receiving normal unicast packets, the tsocket automatically binds a local tport at the router daemon through a remote call to the client IO multiplexor 207 at the router. In one embodiment tports are bound exclusively and other clients may not use it concurrently.

In one example embodiment, communication sockets 225 communicate with a local input output (IO) multiplexor 229 that coordinates the handling of communication between the sockets and the router kernel through the formation of RPC calls, native inter-process communication or similar systems. A local IO multiplexor 229 utilizes an RPC stub 223 or similar program to communicate with the router via an RPC skeleton 219 and client adaptor 209. A client IO multiplexor 207 at the router manages the relay of these socket requests to the kernel 201.

In one embodiment, the router daemon 109 uses a packet buffer to temporarily store packets for each connected client application until they are picked up. An interceptor pipeline in the client adaptor 209 or similar process may be utilized for this buffering function.

To overcome the problem of growing routing tables, computation time and excessive advertisement overhead, large networks can be partitioned into smaller sub sections, connected by gateways. While the gateway routers maintain routing information necessary to route packets to nodes in other network sections, nodes inside a section or domain only maintain information for those nodes inside the same domain. By substituting logical ranges of hosts in the routing table by one single condensed entry, the size of the routing table is reduced. This is called address summarization. This mechanism introduces a form of hierarchy that allows the network as a whole to grow far beyond the practical limits of standard distance-vector or link-state algorithms. The farther a destination host is away, the more efficient it can be condensed together with other remote hosts. The more summarization is applied, though, the less efficient the paths become on average. The factor by which the actual data paths on summarized networks differ from the optimal paths, is known as the stretch-factor: the maximum ratio between the length of a route computed by the routing algorithm and that of a shortest path connecting the same pair of nodes.

In one embodiment, the overlay multicast system takes a relatively straightforward approach to address summarization. An administrator decides at deploy time which nodes form clusters and which clusters form aggregations of clusters. This is done by encoding hierarchy in the layered multicast system node addresses using a dotted or similar notation. Node addresses may be ASCII strings. In one embodiment, the strings are limited to at most 127 characters. In one embodiment, only [a-z] and [0-9] are available. In another embodiment any characters, numbers of similar symbols may be utilized. Addressing may be case-sensitive or case-insensitive.

Figures 3A, 3B:
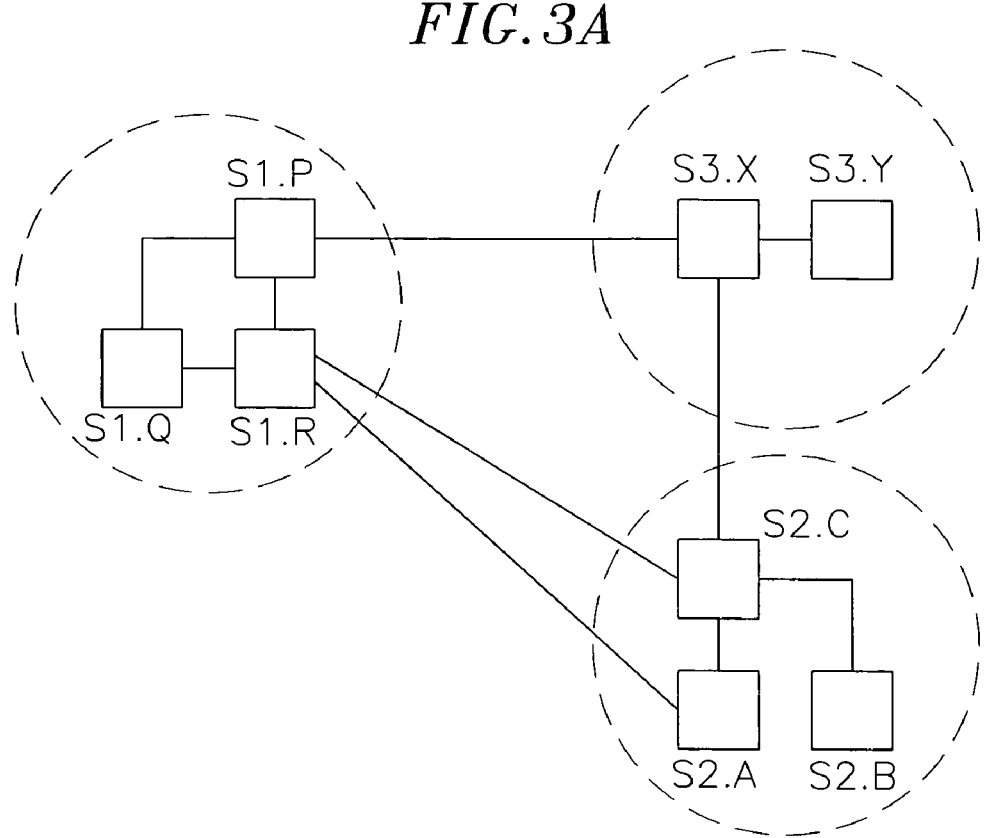
FIG. 3A is diagram of one example embodiment of a layered multicast system network divided into logical clusters.
FIG. 3B is a diagram of a routing table for the network of FIG. 3A.

FIG. 3A is diagram of one example embodiment of a layered multicast system network divided into logical clusters. The example illustrates a network of eight nodes, divided into three clusters. Assigning nodes to clusters may be based on geographical properties, administrative boundaries, wide area links and similar considerations. For example, nodes inside a corporate network are all assigned the same logical domain, whereas a network that connects nodes from different corporations, would usually assign a separate domain to each corporate network. Another criterion for assigning nodes is that nodes that often disconnect and reconnect again later, possibly because the overlay multicast system routers run on personal computers, are placed in a subdomain, to avoid the routing updates triggered by their changing state to propagate far into the network.

Given the logical domains that cluster groups of nearby nodes, each node can treat domains other than its own as a single entity and use a wildcard address that matches every host inside that domain. This reduces the size of the routing table, as well as the amount of routing information that needs to be exchanged between the nodes when the topology changes inside a domain. For example, when a new host is added to domain S1, there is no need to propagate that information to the other domains, as they already have a wildcard entry that will match the new address.

FIG. 3B is a diagram of a routing table for the network of FIG. 3A. The example routing table shows the effect of address summarization in this network on the routing table of node S2.C. The cost value that is listed in the third column represents the cost of the shortest path to the nearest node inside that domain. In the fourth routing entry, the number in the cost column is the cost to reach S1.R from S2.C. If it is assumed that both interdomain links S2.C-S1.R and S2.A-S1.R have the same weight or cost, S2.C will route all traffic for domain S1 through neighbor S1.R.

In one embodiment, when nodes exchange distance vectors, either because of a link change, or as a normal, periodic exchange, the receiving node first summarizes the destination address of each distance vector relative to its own address. Summarization is done by matching the destination address with its own address field-by-field and when a field does not match, the rest of the address is substituted by a wildcard. For example, when S2.C receives a distance-vector from S1.R that contains a path to destination S1.P, it is immediately summarized to S1.* upon arrival at node S2.C. This is because the first field differs from the first field of the local address and as such the remaining fields are replaced by a wildcard. This wildcard value is then fed to the distance vector algorithm that checks whether the new cost or path-length is shorter than the cost of the entry that was already in the routing table. In the present example there already is an S1.* wildcard entry in the routing table that was derived from neighbor destination S1.R. Since the path to S1.P runs through S1.R, the path to S1.R will always be shorter than the path to S1.P, so the entry in the routing table will not be changed and no further routing updates will be propagated to S2.C's neighbors.

In general, when a local address is 1.2.3.4 and an incoming distance-vector advertises destination 1.2.2.2, it will be summarized to 1.2.2.*. Destination 2.1.6 becomes 2.*, destination 1.2.3.4.5.6 becomes 1.2.3.4.5.*, destination 1.2.3.5 stays 1.2.3.5 and destination 1.2.3.4.5 also stays 1.2.3.4.5. Note that 1.2.3 and 1.2.3.* are two different addresses. The first only matches the exact address 1.2.3 while the second is a wildcard that matches everything that starts with 1.2.3 and has at least 4 address fields. This includes 1.2.3.4 and 1.2.3.4.5.6, but not 1.2.3. If this mechanism of address summarization is used in an ExBF implementation that carries tuples containing destination, cost and head-of-path attributes in its vectors, then the destination address is summarized, as well as the head-of-path address.

Figure 4:
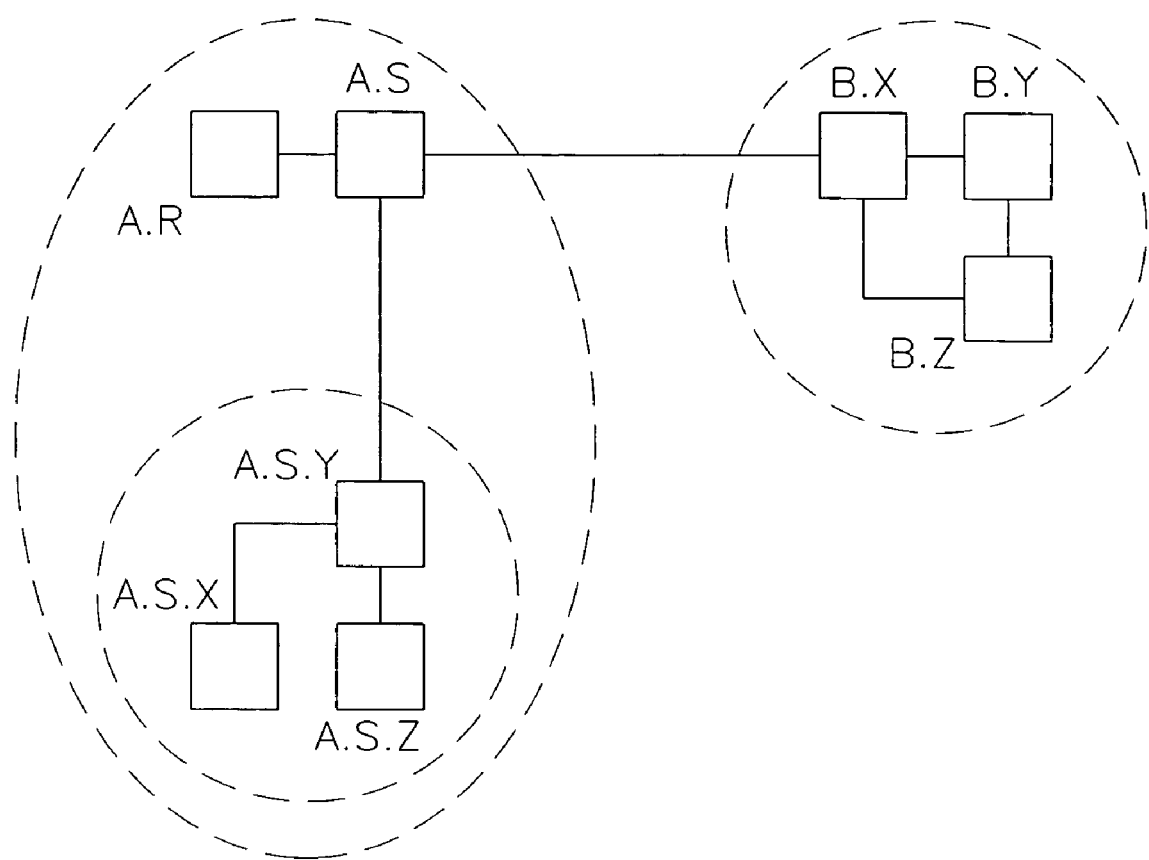
FIG. 4 is a diagram of an example network with hierarchical structure.

FIG. 4 is a diagram of an example network with a hierarchical structure. When the example network first starts to converge using the ExBF algorithm, node B.X advertises the following routing information to neighbor A.S: $DV_{B.X,A.S}$: $\{(B.X, *, 0), (B.Y, B.X, 1), (B.Z, B.X, 1)\}$. When A.S receives the vectors, it summarizes its entries. What remains is the single vector $DV_{B.X,A.S}$: $\{(B.*, *, 0)\}$. The routing table of node A.S now contains $RT_{A.S}$: $\{(A.S, *, *, 0), (A.R, A.R, A.S, 1), (B.*, B.*, A.S, 1)\}$. All addresses are summarized before processing. This includes neighbor addresses. The consequence of this is that when a node has more than one connection with a foreign domain, both neighbor addresses will be summarized into the same wildcard. This leads to ambiguities and non-deterministic routing when this wildcard is listed as the preferred hop in a routing entry, as it can not identify a single outgoing link. This problem is solved by assigning a local identifier to each link and using these numbers in the preferred hop column, rather than the addresses of the links peers. The routing update A.S sends to A.S.Y contains $DV_{A.S,A.S.Y}$: $\{(A.S, *, 0), (A.R, A.S, 1), (B.*, A.S, 1)\}$ and leads to A.S.Y's routing table $RT_{A.S.Y}$: $\{(A.S.Y, *, *, 0), (A.S.X, A.S.X, A.S.Y, 1), (A.S.Z, A.S.Z, A.S.Y, 1), (A.S, A.S, A.S.Y, 1), (A.R, A.S, A.S, 2), (B.*, A.S, A.S, 2)\}$. When A.S.Y has finished updating its routing table, it advertises $DV_{A.S.Y,A.S}$: $\{(A.S.Y, *, 0), (A.S.X, A.S.Y, 1), (A.S.Z, A.S.Y, 1), (B.*, *, *), (A.S, *, *), (A.R, *, *)\}$ back to neighbor A.S where the asterisk indicates unreachable in the last three records to avoid long-lived loops. These loops were detected through the normal back trace mechanism of ExBF.

In one embodiment, summarization means that only a single path for a range of remote nodes is maintained. The consequence of this is that packets will not always be routed according to the real shortest path between source and destination. To illustrate this effect in the multicast network, consider the example network of FIG. 4. Node S1.R receives the distance-vectors of both S2.A and S2.C. And after summarization learns that both neighbors offer a route for wildcard S2.*. If it is assumed that both interdomain links (S1.R-S2.A and S1.R-S2.C) have equals costs, then S1.R will choose S2.A to be the preferred hop for S2.* because of the fact that its address logically comes first. When S1.R needs to forward a data packet to S2.B, it uses the S2.* wildcard entry and forwards the packet to neighbor S2.A. Unfortunately this is not the shortest path to S2.B, as S2.A first has to route the packet through S2.C. Instead, S1.R should have sent the packet directly through neighbor S2.C. This ratio between the length of the actual path and the length of the optimal path between the endpoints are called the stretch factor.

In one embodiment, path stretching on the overlay multicast system occurs when packets are forwarded between nodes that are in different logical domains. An entire subnet is treated as a single node with several outgoing links. Because a virtual node often contains a large number of nodes, connected by its own internal network structure, it is sometimes better to choose a different interdomain link when sending packets to the domain.

Since the overlay network runs its own adaptive routing algorithms, the content streams through the network are constantly rerouted to avoid the network's hot spots and congestion. This can be particularly useful on wide area networks that are used for very different types of applications and hot spots are dynamic (i.e., moving around). Another advantage of having custom routing algorithms is the freedom of substituting them with others in the future.

In one embodiment, the software routers implement load-balancing inside the network. Traditionally, routing algorithms seek for "best paths" through the network and send datastreams over these. However, it is sometimes much more desriable not to just send streams over this optimal path, but to also select several sub-optimal paths and divide the stream over all of them. This also avoids the optimal path from getting congested when the stream requires more bandwidth than this single path can provide.

Figure 5A:
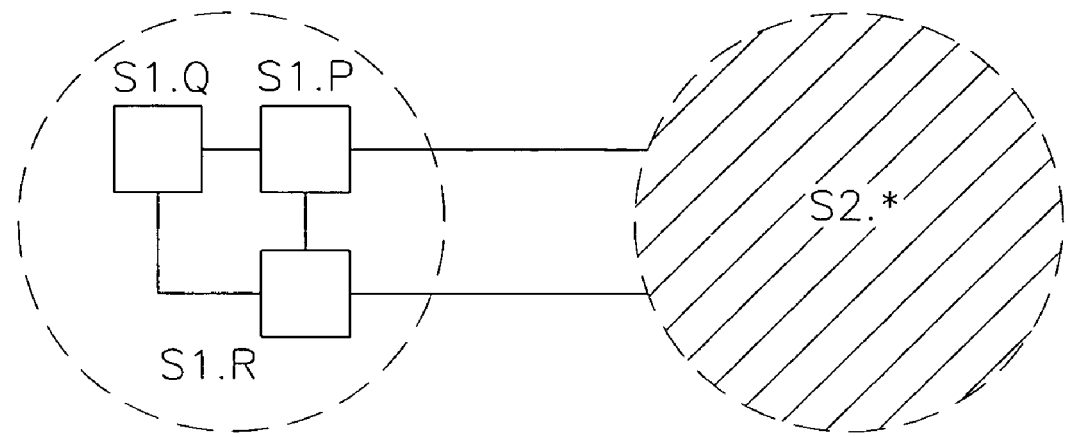
FIG. 5A is a diagram demonstrating summarization of an example network with an S2 domain.
Figure 5B:
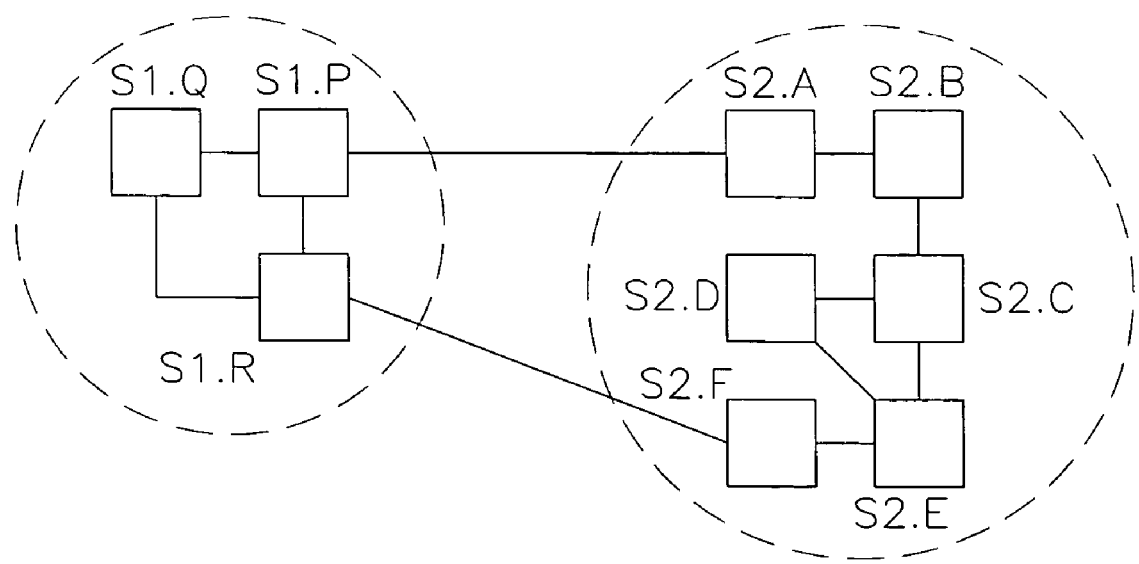
FIG. 5B is a diagram demonstrating the stretch factor for the example network of FIG. 5A and shows the inner network of the S2 domain.

FIG. 5A is a diagram demonstrating summarization of an example network with an S2 domain. When node S1.P needs to forward a packet for destination S2.F, it will send the packet directly down its interdomain link to the S2 domain. In this example both interdomain links are assumed to have equal costs. FIG. 5B is a diagram demonstrating the stretch factor for the example network of FIG. 5A and shows the inner network of the S2 domain. FIG. 5B clearly shows that the stretch-factor is quite high for packets from S1.P to S2.F, as the optimal path runs through S1.R instead. Although the overlay multicast system address summarization technique can not guarantee a maximum upper bound on the stretch-factor, it can manipulate the stretch-factor by changing the summarization opacity.

By default, an address is summarized after the first field that differs from the local address. However, if that is changed to the second field, the overlay multicast system can look inside other domains for one level. A node with an address 1.2.3.4 will then summarize 2.3.4.5 into 2.3.*, rather than 2.* and 1.3.4.5 into 1.3.4.*, rather than 1.3.*. Doing this at least at the border nodes in the overlay multicast network that have the interdomain links reduces the stretch-factor under certain circumstances. As the overlay multicast network was designed to be administrated by independent parties, administrators are free to experiment with different summarization opacity levels without jeopardizing the other subnets or domains.

One advantage of the summarization of addresses in routing tables is that the number of links that are present between nodes from different logical domains is irrelevant with respect to the number of routing entries in the routing table of a distance-vector protocol or similar protocols. Since these tables only contain destinations with a single forwarding strategy, the number of interdomain links does affect the size of the routing tables. If y is identified to be the number of entries in a node's routing table, x to be the total number of nodes in the entire network, n to be the number of entities (nodes or nested domains) inside a domain and m to be the depth of the hierarchy. From this it follows that the total number of nodes in the network can be calculated with:

$$\forall x = n^m \text{ where } n \in \mathbb{N} \land n > 1 \text{ and } m \in \mathbb{N} \land m > 0$$

The relation between domain depth, number of nodes and domain density can be expressed by the following formula for a network with a uniform topology:

$$y = \left(\frac{\ln(x)}{\ln(n)}\right) * (n-1) + 1$$

Given this formula of the address summarization's effectiveness, it can be shown that routing entries in any network node remains under 100 even when the network as a whole grows to well over 10 million nodes. It can also be shown that the domain size n has no spectacular effect on the scalability. While a small value n yields a relatively deeply nested network hierarchy, which implies more routing entries, it also means that each hierarchy level only contains a small number of entities. A large value n in a network of the same size yields a relatively flat hierarchy with few levels, each level contains a large number of entities. As a routing table can only contain a natural number of entries, its number remains constant as nodes are added to domains that are already captured by the existing wildcard entries.

An advantage of using a string based node addresses scheme is its large address space and flexible naming. New subdomains may be added at any time as there is no need for predefined or fixed hierarchical levels. All nodes inside a flat domain can be reconfigured into nested subdomains without the need to reconfigure routers or compute netmasks. Also, as address fields are not bound to a limited number of characters, they contain location or company names to make administration of the network easier and more transparent. An example might be the address nl.amsterdam.level3.marketxs.node4, or simply nl.ams.l3.mxs.n3 to keep the address relatively short. The drawback of these kinds of unrestricted addresses is the amount of bytes they require. Because every data packet always contains a source and a destination address, the amount of overhead per packet is excessive at times.

In one embodiment, the string based node addresses scheme is implemented by letting the first bytes of each address header specify the length of the address in bytes, followed by the address itself as a normal 8 bit ASCII string with a maximum of, for example, 256 bytes. In one alternative, null-terminated strings are used.

In another embodiment, a sufficiently large address space is used and divided it into logical subsets, similar to IPv4 and IPv6 addresses. In one embodiment, a 64 bit address space is used and divided into 8 bit fields (identical to IPv6) used to identify logical subnets. In this embodiment, addresses might look like 120-23-61-201-43-146-128-132. To make distinct addresses, IPv4 uses the dot ".", for separation, IPv6 uses the colon ":" and the present system uses a hyphen "-". When each address field represents exactly one logical subnet level, this scheme provides a simple, but at the same time somewhat limited, way of addressing. It means that the complete network can address as many individual hosts as IPv6, while grouping them in at most 8 levels of sub domains, where each sub domain can contain a maximum of 256 hosts or sub domains. The sub domains can be utilized to indicate a network hierarchy in the topology, including a geographical or similarly based heirarchy.

In one embodiment, to reduce the amount of bandwidth wasted on this overhead, a mechanism is used for substituting the address strings for small 16 bit values or similar small sized value when transmitting a packet to a neighbor. Also, a translation table is kept at both sides of the connection that is used to put the original address string back in the packet before passing it to the router's packet switching kernel. This optimization works on a per-link basis and may be totally independent from the communication with other neighbors. When it is used on more than one interface, each interface maintains its own translation table.

If a packet is transmitted to a neighbor, all address strings are stripped from the packet header. For each address string a 16 bit or similar value is generated and stored in the translation table. These 16 bits or similar values replace the original addresses and before the packet is transmitted, its protocol version field in the first header of its wire-level representation is changed to a higher version. This version number is reserved for optimized packets that would be unreadable for routers without support for address substitution. To ensure proper translation by the peer, the interface first sends a special packet that contains the new address substitutions. Such a packet is tagged with the higher protocol version number and contains one or more tuples of address strings and their substitute values. In one embodiment, such a packet takes the form:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|version| type  |    unused     |            length             |
+-+-+-+-+-+-+-+-+-+-+-+-+-+-+-+-+-+-+-+-+-+-+-+-+-+-+-+-+-+-+-+-+
|    address 1 (max 128 bytes)  |   16 bit substituted value    |
+-+-+-+-+-+-+-+-+-+-+-+-+-+-+-+-+-+-+-+-+-+-+-+-+-+-+-+-+-+-+-+-+
|    address 2 (max 128 bytes)  |   16 bit substituted value    |
+-+-+-+-+-+-+-+-+-+-+-+-+-+-+-+-+-+-+-+-+-+-+-+-+-+-+-+-+-+-+-+-+
|    address 3 (max 128 bytes)  |   16 bit substituted value    |
+-+-+-+-+-+-+-+-+-+-+-+-+-+-+-+-+-+-+-+-+-+-+-+-+-+-+-+-+-+-+-+-+
```

Type 0x1 is used for issuing new substitutions and type 0x2 is used to invalidate an earlier or unknown substitution. The system attempts to ensure that this (or similar) packet is received by the peer prior to the data packet itself, which is something that cannot be guaranteed by every transport layer. TCP or similar guaranteed communication method may be used for communication between neighbor nodes in the overlay multicast network.

In one embodiment, configuring an interface for address substitution can be done manually, or automatically. In the latter case the interface uses a special handshake packet that is part of the higher protocol version. In one embodiment, the handshake packet takes the form:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|version| type  |     unused    |            length             |
+-+-+-+-+-+-+-+-+-+-+-+-+-+-+-+-+-+-+-+-+-+-+-+-+-+-+-+-+-+-+-+-+
```

The version field has the higher protocol version. The type for the handshake packet is 0x0 and the length is 4. A peer transmits such a (or similar) packet when the connection is first established. When the packet is echoed back by the peer, the interface knows that the neighbor also supports substitution and goes into substitution mode. After a connection with a neighbor has been lost and is re-established, the handshake is performed again as the peer could have been replaced by software that does not support substitution.

In one embodiment, entries in the translation table all have a time-out or similar tracking mechanism to ensure timelines and accuracy of entries. After this period the entry is removed from the table and any packet still using the substituted value will not be processed and cause the receiving node to respond with a special packet containing the substituted values that weren't recognized, allowing the peer to synchronize translation tables by sending a packet containing the substitution tuples. Since the invalidation of timed-out entries is automatic, both peers use the same time-out or similar values in tracking mechanisms. In one embodiment, when the translation table is full, entries are removed according to a last recently used scheme. The address substitution is implemented in a substitution interceptor that is the lowest interceptor or a part of the lowest interceptor or other interceptor reconstructing packets immediately on arrival in an interface module of a router. Substitution introduces additional processing overhead and enabling it is optional for each node.

In one embodiment, the overlay multicast system may be used solely for routing. The overlay multicast system offers multicast support over existing IP networks. The overlay multicast system goes beyond offering plain multicast functionality and additionally focuses on supporting live multicast streams with limited jitter and delay through the combination of overlay multicast, multicast congestion control and layered multicast.

In the overlay multicast system the ExBF protocol or similar routing algorithm implicitly contains information on which links in the network are child links. For example, this is a by-product of the long-lived loop avoidance mechanism in ExBF. In ExBF, a node will inform its neighbors about the fastest route it offers to a destination S, except the neighbor that is in the path towards S. Instead, an infinite distance is advertised to this neighbor. This information is used by a router to conclude that each neighbor advertising that node S is unreachable, is actually using it as their parent node towards S and hence will immediately mark those links as child links in the shortest path tree rooted at S.

Neighbors that do advertise reachable routes to destination S are not flagged as child links and therefore not used when forwarding multipoint packets from S. In another embodiment, this implicit information is available through any distance-vector protocol that uses poisoned reverse or similar techniques. Both methods are used to quickly deliver a copy of any multipoint packet to all nodes in the network. A disadvantage of both mechanisms however is that a copy of every packet is delivered to every node, regardless of whether or not that node is actually interested in multipoint packets from that source.

In one embodiment, the overlay multicast system is equipped with a sparse forwarding mechanism. The overlay multicast system network is used for a single source multicast for high volume market data, video streams or similar data to be sent to large numbers receivers. In these types of uses it is not necessary that receivers themselves or other nodes be capable of publishing data packets to the multicast group. Instead, for security reasons it is better to know that only the real source can publish to the group. Given these requirements, together with the fact that multi-source protocols are more complex than their single-source alternatives, in one embodiment, the overlay multicast system preferably uses a custom single-source protocol for multicast distribution on the network. In another embodiment, the overlay multicast system supports multiple sources. For sake of convenience an embodiment of a single source multicast network is discussed. One of ordinary skill in the art would understand that the principles of operation can also be applied to a multi-source application as well.

Figure 6:
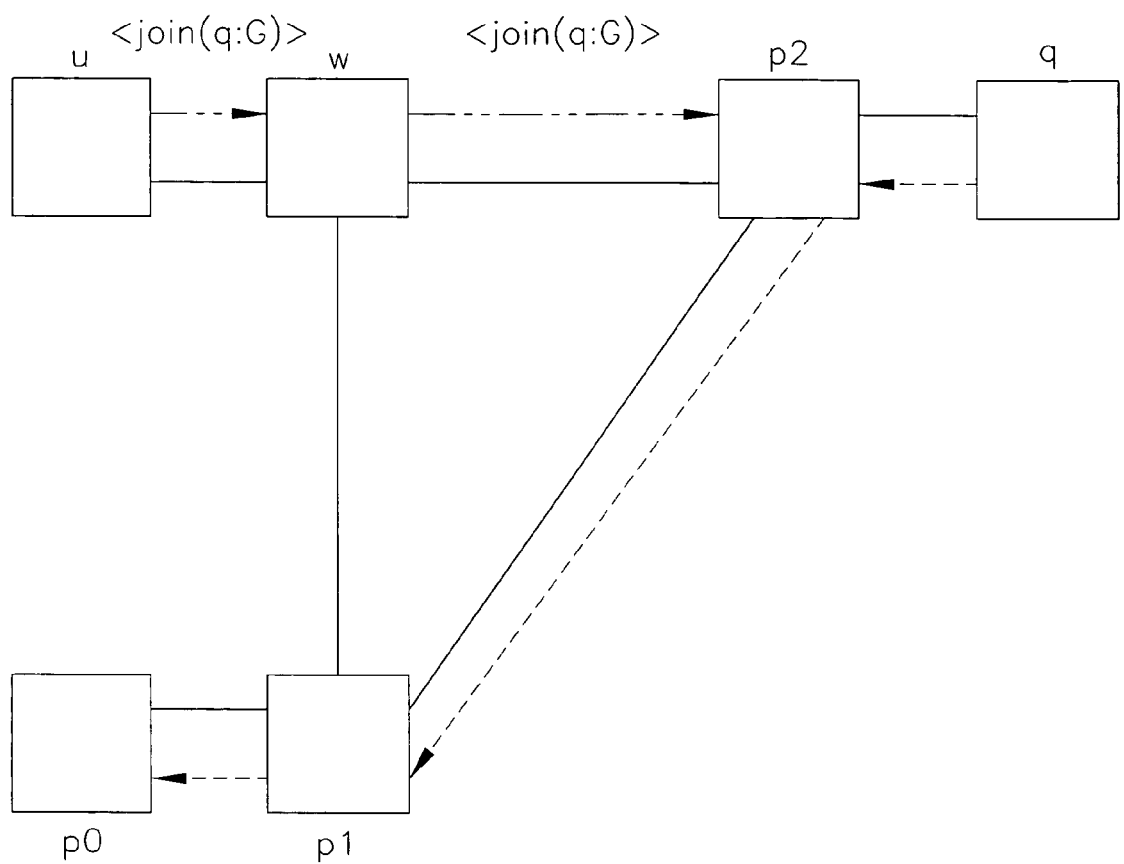
FIG. 6 is a diagram of an example embodiment of a multicast distribution or "sink" tree.

FIG. 6 is a diagram of an example embodiment of a multicast distribution or "sink" tree. In the example embodiment, the multicast system starts with a source q that is active, but in this example, a sparse-mode protocol, with no receiver yet subscribed, no distribution tree exists. When the first receiver application $p_0$ subscribes, its router initiates the reverse computation of one branch of the sink tree rooted at source q. It does so by first marking that $p_0$ has a local subscriber for q:G by setting the bit in $LS_{p0}[q,s]$ ($LS_p[]$ is a local array at node p that keeps track of all subscriptions of the local user applications connected to router p) to true and then sending a join (e.g., a <join (q:G)>) packet to the preferred hop towards source q. This neighbor $p_1$ receives the <join (q:G)> packet and marks the link with $p_0$ as a child link for multicast group q:G. It then forwards the packet to the next hop $p_2$ in the shortest path towards q. Eventually node $p_n$ sends the <join (q:G)> packet to q. On receipt, q marks the link on which the packet was received as a child link for its local multicast group G and starts forwarding all packets addressed to G over the link to node $p_n$. The multipoint packets addressed to G are inserted into the overlay multicast network at node q by the user application that previously bound the local multicast group q:G in publish mode. Nodes $p_n, p_{n-1}, \ldots, p_1$ all forward the packets to their neighbors from which a <join (q:G)> packet was received earlier. Node $p_0$ has no child links for q:G, but does have $LS_{p0}[q:G]$ set, so it delivers the packets to the local application. When another node $p_1$ becomes interested in q:G while $LS_{pi}[q:G]$ is not already set, it sends a <join (q:G)> packet to its preferred hop towards q. Let $p_{i+n}$ be in the path from $p_i$ to q that receives the <join (q:G)> packet and suppose that $p_{i+n}$ is also in the path between $p_0$ and q. In this case, $p_{i+n}$ is already in the established part of the sink tree of q, so it does not need to forward the <join (q:G)> packet further to q. Instead, it only marks the link on which it received the packet as a child link for q:G. In general, a node u only forwards a <join (S:G)> packet towards S if it is not already subscribed to S:G (hence, $LS_u[S:G]$ is not set and the collection of child links for S:G is empty).

The example sparse-mode distribution tree generated when processes subscribe to a S:Q group originally equals a part or all of the optimal sink tree rooted at S. However, when the underlying unicast routing algorithm detects changes in the network performance and updates some of the routing table entries, the optimal sink tree changes accordingly and may no longer be matched by the multicast distribution tree, rendering the tree as well as the multicast performance suboptimal. An extreme example of this is when a link that is part of the multicast distribution fails entirely.

Figure 7:
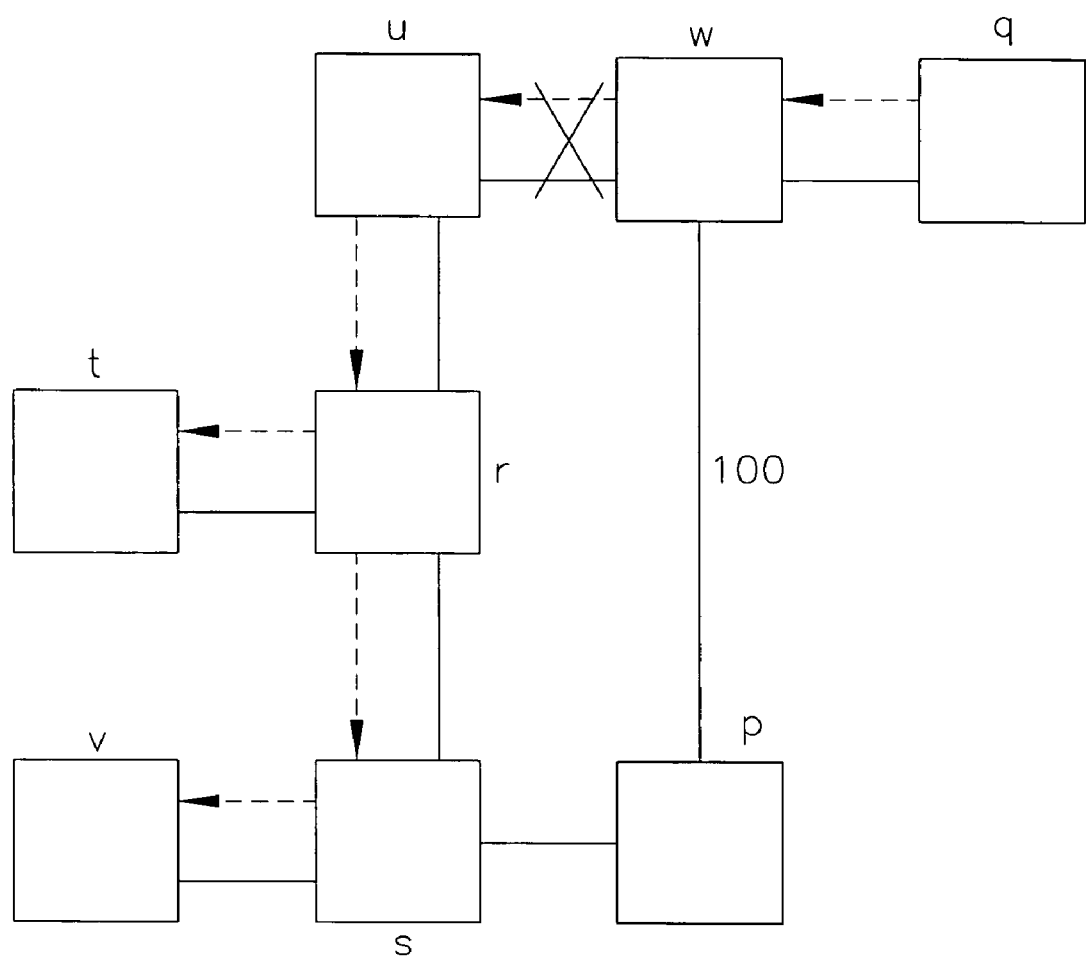
FIG. 7 is a diagram of an overlay multicast network with a failed link.

FIG. 7 is a diagram of an example overlay multicast network with a failed link. In the example a node U currently in the distribution tree for q:G only has a single route to q via w. The link between u and w fails. The node u concludes that it can no longer be part of the distribution tree (as u and q are no longer connected) and invalidates all child link subscription information. In case $LS_u[q:G]$ is set (i.e., the subscription table indicates that u is subscribed to group G from node q), u will rejoin the distribution tree as soon as a new path to q is found. In another embodiment, the algorithm sends a notification to the locally subscribed application to indicate that u is no longer connected to q.

In the example, it is assumed that all links have weight 1, while the link between p and w has weight 100. The result is that the link connecting p and w is not in the optimal sink tree rooted at q. Since only t and v have a local subscriber ($LS_t[q:G]$ and $LS_v[q:G]$ are set), the sparse distribution tree in this example equals the dotted arrows of FIG. 7.

In the example, nodes w, u, r and s all have only a single route to q. Node p has a path through both s and w, while s is the preferred hop towards q. When the link between u and w fails, u becomes disconnected from q and invalidates the subscription information for link u-r. Node u informs neighbor r of this fact as part of an immediate distance-vector exchange. This routing update implicitly tells node r that its join for q:G through u is no longer valid and that it should look for an alternative neighbor to rejoin.

In the example, an explicit leave packet to u is unnecessary. Since r is also left with no alternative path to q and has no locally subscribed applications, it invalidates its q:G subscription and is no longer part of the distribution tree. Neighbors t and s are implicitly informed about this through the ExBF routing update or similar routing update sent by r. Eventually w, u, r and s all leave the distribution tree, while nodes t and v schedule a rejoin when a new path to q is found. Again, they inform their local subscriber applications about this. When p receives the routing update from s, it looses its preferred hop for q and switches to neighbor w. The new cost to q is now 100 plus distance(w, q) and neighbor s is informed.

Upon receipt, s discovers the new path to q and informs its neighbors r and v. Node v then sends the <join (q:G)> packet to s. Nodes s, p and w then construct the first part of the new, optimal distribution tree rooted at q. When the new path reaches r and t, t sends a join packet to r and r to s, reconnecting all receivers to the data stream.

In one embodiment, recovering from link failure or similar communication errors is divided in three steps. In the first step the underlying ExBF or similar routing protocol starts a wave that propagates a link failure through the network. Depending on the actual topology, this takes up to N−1 packets, where N represents the number of nodes in the network. The worst case time complexity for recovering from a link failure is 3N when ExBF or similar algorithm is used as the underlying unicast routing algorithm. A best case time complexity would be 2N.

The example discusses a scenario where the system recovers from a failure of a link that is part of the multicast distribution tree. More often however, links will not fail completely, but rather fluctuate in quality, causing the underlying routing algorithm to reassign preferred neighbors. In this example case it is not a requirement that the distribution tree is changed to reflect these changes, as it is not partitioned. However, since the tree becomes sub-optimal, it is changed.

In one embodiment, the decision whether or not to recompute a distribution tree after a routing table update, is made according to the quality of the used path. When a node p in the tree detects that the neighbor in the optimal path towards the multicast source has a cost that is only marginally lower than the neighbor that is currently p's parent in the actual distribution tree, the overhead of recomputation and the risk of packet loss outweighs the increased performance of the new tree. Also, since the quality of each link is continuously re-evaluated, the updated sink tree may only be temporal. Two straightforward solutions to this can be used. Either the algorithm sets a threshold on recomputation so that subscriptions are only moved to the neighbor with the currently optimal path towards the source if the decrease in cost is at least a ratio x, where x>1. A larger value of x then postpone tree adjustments until a substantial improvement can be gained, while a smaller X makes the tree actively follow the changing characteristics of the underlying network.

Another solution is to postpone recomputation of the tree for a period inversely proportional to the cost decrease ration x. The latter has the advantage that the optimal distribution tree is always guaranteed to be reached in finite time since the last routing table change.

In one embodiment, to run the tree building protocol, two new messages are introduced: the join message and the leave message. Both messages use a GroupData control message of the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|version| type  |    unused     |             length            |
+-+-+-+-+-+-+-+-+-+-+-+-+-+-+-+-+-+-+-+-+-+-+-+-+-+-+-+-+-+-+-+-+
| control type  |          num groups           |    unused     |
+-+-+-+-+-+-+-+-+-+-+-+-+-+-+-+-+-+-+-+-+-+-+-+-+-+-+-+-+-+-+-+-+
|                   source address (max 128 bytes)              |
+-+-+-+-+-+-+-+-+-+-+-+-+-+-+-+-+-+-+-+-+-+-+-+-+-+-+-+-+-+-+-+-+
|                   source address (max 128 bytes)              |
+-+-+-+-+-+-+-+-+-+-+-+-+-+-+-+-+-+-+-+-+-+-+-+-+-+-+-+-+-+-+-+-+
```

This message is used to send a list of subscriptions to a neighbor node or to cancel an aggregated list of subscriptions with a neighbor. The action field ($9^{th}$ byte) is used to distinguish between join and leave. The $10^{th}$ and $11^{th}$ byte indicate the number of (S, G) groups in the message. The action field is either "join" (0) or "leave" (1). In an alternative embodiment, this is extended to "stale", "dead", etc, to indicate the state of the publishing application.

Many multicast applications require some level of reliable communication. Examples of this are uploading files to several receivers simultaneously or replicating web server caches. Without guaranteed delivery, a multicast transport service has limited applicability. In one embodiment, the overlay multicast network utilizes standard delivery control based on moderating the sending of data based on the lowest bandwidth available on the route to a destination. However, this delivery system is unsuitable for certain applications.

One example is financial data distribution, it needs a transport service that can multicast live data without packet loss or corruption and without substantial end-to-end delay when parts of the network are temporarily or permanently congested. While live market data cannot tolerate random packet loss, it can be thinned. Under certain circumstances it is acceptable to omit certain stock quote updates. An example is a desktop application that displays real-time updates for hundreds or thousands of financial instruments. If all quote updates were delivered to this application, this would require a substantial amount of bandwidth and would cause the value of the more volatile instruments to change faster than a human can read. The data may be thinned through a process that involves inspection of the individual stock quotes and encoding them in individual data packets, tagging each with a priority value. For this application, as long as all packets labeled with the highest priority number are received, the partial stream can be considered intact. Additionally, when all updates of the second highest priority are also received, the quality of the partial stream is increased usually in the form of less latency.

In one embodiment of the overlay multicast system, priority numbers are associated with data packets. The priority numbers represent a logical layer inside a data stream. Data provided by a multicast application may be in the form of a stream of data. This data is subdivided into categories or priorities based on the nature of the data. When packets in a data stream are labeled with priorities in the range 0 to 3, the stream is said to have 4 layers. Also, the convention is to treat 0 as the highest priority and 3 as the lowest. Any other system of identifying priority levels may be utilized including alpha numeric indicators or similar identifiers. If a stream only contains a single layer, all packets are labeled with priority 0.

To software router daemons, a priority value of a packet is relative to the stream and becomes relevant when a decision to discard data at a congested router is made. The priority value has no meaning other than as a criterion for discarding packets on congested links. When an outgoing link of a router has insufficient bandwidth to transmit all pending packets, it forwards only those packets with a designated priority or the highest priority. This technique is also applied to any data type, including audio/video data and financial data. Using this system, the packet priority numbers cannot be misused by sources to give their data packets a greater chance of prioritized transmission by giving them the highest priority to gain advantage over other sources. Packet priorities are only compared between packets that are part of the same data stream.

In one embodiment, knowing that routers will use the packet priority numbers when making forwarding selections on congested parts of the network, a source carefully divides its data packets over different layers or priorities, in a way that a subset of the layers still contain a useful, uncorrupted representation of the data. This system is especially useful when multicasting a live data stream with a high data rate to a large number of receivers, scattered over a heterogeneous wide area network. Receivers that are on congested parts of the network will then receive the highest priority parts of the data only. This eliminates the need to lower the publishing rate to match the slowest receiver, while still being able to offer live, uncorrupted, thinned data streams to clients suffering from insufficient bandwidth. Example applications of the system include audio and video codecs that divide live multimedia content over layers to enhance the user experience over wide area networks.

In one embodiment, incoming messages are sorted by unicast or multicast sender address. As described above, a sender address is the combination of source router address and application session. An example of a source address is nl.mxs.office.erik:video.an2 which could be used by a user application broadcasting a video channel. In this case, only the source address is relevant, not the (uni- or multicast) destination address. Each incoming message is added to the queue that holds messages sent by that particular sender. If this is the first message from a sender, a new queue is automatically created to store it.

Figure 8A:
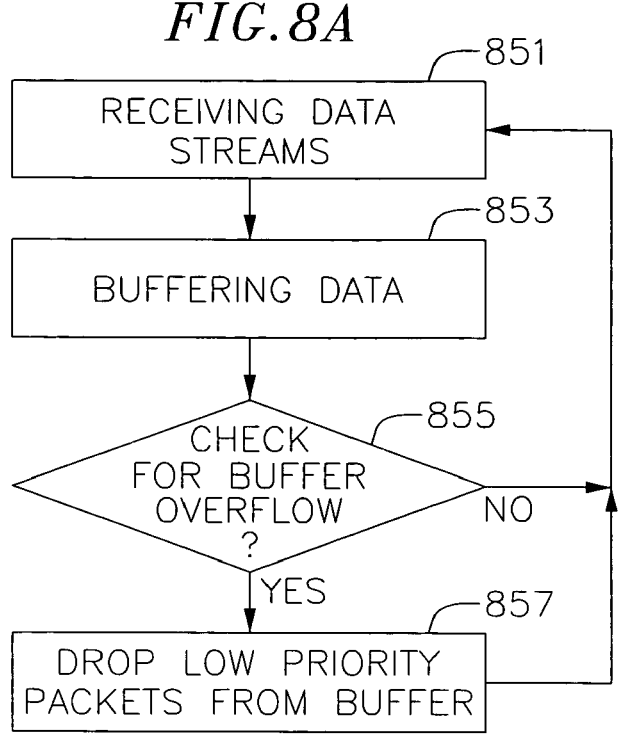
FIG. 8A is a flowchart of one embodiment of a process or managing congestion in the overlay multicast system.

FIG. 8A is a flowchart of one embodiment of a process for managing congestion in the overlay multicast system. The congestion can be managed at each individual router. In one embodiment, the congestion is managed at the interface module level in each router. Each interface module has an inbound pipeline and outbound pipeline discussed above for processing inbound and outbound data. Each pipeline buffers data that is awaiting further processing. However, if either pipeline is unable to keep up with the pace of incoming data that needs to be processed some data must dropped.

In one embodiment, data is received as a set of data streams at each router (block 851). The data is then buffered in the inbound pipeline buffer (block 853). The same process applies to outbound data that is received from the kernel by the outbound pipeline. This data is stored in the outbound buffer. After the data has been stored a check is made of the inbound or outbound buffer to determine if it is full (block 855). In one embodiment, data is stored in the data structures in the buffers that organize the data packets into a set of queues. Each source address, data stream or layer in a data stream has a separate queue. A queue is sorted with highest priority and oldest data packets at the front of the queue. If the buffer is full then a decision is made to drop a designated amount of data in the form of packets from the buffer to make room for incoming data packets (block 857).

In one embodiment, a queue is chosen randomly or in a round robin to have data dropped. In another embodiment, the queue with the most data is chosen to have data dropped. In a further embodiment, a weighting factor is calculated to determine which queue is selected to have data dropped. The weighting factor is based on the amount of data in a queue, size of packets in a queue and similar factors. The weighting factor counteracts unfair distribution that is caused by selecting a queue by a round robin, random or similar method of selection. Data streams with large packets are unfairly affected by other methods because a disproportionate amount of data is dropped in comparison with other queues with smaller packets. Queue selection is also influence by the size and the amount of data that is intended to be dropped. A large queue that can drop close to the amount of data desired is weighted for selection.

In one embodiment, data is dropped if a total amount of data stored in all queues exceeds a threshold value. This threshold value is set by an administrator or is a set value. These systems enforce the fair allotment of bandwidth between data streams. Also, this system implements the prioritization of logical layers by dropping lower priority level layers when congestion occurs. If the buffer is not full then the pipelines may continue to store data in the buffers (block 851).

In one embodiment, while the queues grow in size as packets are received, a background thread constantly dequeues packets from the queues and transmits them over the network.

In one embodiment, the system that manages in- and output for the queues is divided in two parts. The first part is run by the background thread that constantly dequeues packets from the queues and transmits them over the network, while the second part is in charge of queuing new packets that are to be transmitted. The latter also implements the logic that defines when and which packet should be discarded (due to a buffer overflow).

The dequeuing part of the system, when selecting a packet for transmission, only looks at the first packet (most urgent) of each queue. To make sure each stream gets an equal share of bandwidth, it takes the individual packet sizes into account. When all packets (note that only the first packet of each queue is observed) have equal size, the dequeuing thread simply selects a random queue with equal probability and dequeues one of its packets. Since each queue has the same probability of being selected, each queue will deliver an equal amount of packets per time unit. Hence, each source will transmit an equal amount of bytes per second.

Since individual packets can have any size between 1 and some determined maximum number of bytes, their size must be considered when the transmit thread selects queues. Queues with many large packets should generally have a smaller probability of getting selected than queues with lots of small packets in order to keep the bandwidth division fair.

In one embodiment, only the first packet of each queue is considered to represent its queue and give it a probability of setting selected that is reversely proportional to its size in bytes. In an example where there are three queues, P, Q and R where the first packet in P is 100 bytes, the first packet from sender Q is 300 bytes, while the packet from R is 500 bytes, to calculate the selection probabilities, first their respective selection weights are defined. For example, the weight of the packet in P is computed by dividing the total size of P, Q and R by P's size: (100+300+500)/100=9. Q's weight is 3 and R's weight is 9/5. The weights are converted into selection probabilities by dividing them by the sum of all weights. This gives P a probability of 9/(9+3+1.8)=0.65, Q a probability of 0.22 and R of 0.13. When a queue becomes empty after dequeuing, it is removed.

In one embodiment, to keep the delay introduced by buffering packets under control, the second part of the system enforces a maximum total queue size. The sum of all packets in all queues may never exceed this threshold. When a new packet comes in, it is always accepted at first. If necessary a new queue is created for it, or it is added to its designated, existing queue. After adding a new packet, the total size of all queues is checked. If it is larger than the configured maximum, the algorithm runs a removal round in which it first selects a queue and then tells that queue to remove one packet. If the queues are still to big after removal of one packet, the process of selecting a queue and removing a packet is repeated iteratively until the total queue size is smaller than or equal to the configured maximum.

In one embodiment, shrinking the queues is always done after a packet was added, never preemptively. The reason for this is to let the new packet immediately participate in the removal selection process, rather than discarding it or making room for it at the expense of the other queues. Contrary to de-queuing packets, where the algorithm tries to select the "most urgent" packet, we now need to select the "least urgent" one. This packet is determined by looking at the size of the individual queues (the largest queue should generally be shrunk to keep resource division among the streams fair) and which queue can match the required size most accurately. This comes from the fact that individual packets can differ greatly in size, so removing the "least urgent" packet from queue P could result in freeing 8 kilobytes, while removing the "least urgent" packet from queue Q yields 40 bytes of space for example. Now if the queues in total exceed the maximum size by only a couple of bytes, it seems logical to remove the small packet from Q. This policy comes with a consequence, namely that it implicitly promotes the use of larger packets. After all, streams with lots of very small packets are more likely to accurately match the amount of buffer space that must be freed than stream queues with few very large packets. This property may encourage developers to use larger packets, increasing the efficiency and throughput of the network. In short, when selecting a queue for shrinking, the system favors queues that are will expunge the least amount of bytes in order to match the total buffer capacity and are large compared to the others.

In one embodiment, before the selection can be made, the absolute weight factor for each queue is computed. The weight factor combines the queue's size and ability to accurately match the overcapacity of the buffer by removing packets. The latter is exposed in v. It represents the sum of the sizes of the packets that a queue must remove in order to eliminate the buffer's overcapacity. For example, if a queue P has 10 packets of 100 bytes each while the buffer currently has an overcapacity of 170 bytes (suppose the maximum is 10000 bytes, while all queues combined add up to 10170 bytes), P would need to remove at least 2 packets (2*100 bytes). In this case, $v_p$ is 200. The formula to compute the absolute weight factor of queue m is defined:

$$w_m = \frac{\left(\sum_{i=0}^{n} v_i\right) \cdot s_m}{v_m}$$

In this formula, n represents the total number of queues, v represents the number of bytes that would be removed if the queue was selected and s represents the total size of a particular queue. The formula captures the direct relation to queue size and the inverse relation to the amount of bytes that would be removed by the queue if it was selected.

When the absolute weight factors of all queues have been derived, they are converted to weighted selection probabilities. This is done by dividing the individual weight values by the sum of all weights. The selection probability of queue m is expressed in $P_m$.

$$P_m = \frac{w_m}{\sum_{i=0}^{n} w_i}$$

After the selection probabilities have been computed, a roulette-wheel algorithm is run to select a queue and let that queue remove its v bytes. If v is smaller than the current overcapacity of the buffer in total (note that this implies that the selected queue became empty and was thus removed automatically), another selection round is done until the buffers shrunk sufficiently. Note that the queue selection process is implemented as an atomic operation. During selection rounds no new packets may be added to or removed from the queues.

In one embodiment, the overlay multicast system is a layered multicast in combination with a scalable, selective packet retransmission mechanism to offer a service that can meet the demands of real-time financial data and similar applications. Selective packet retransmissions are crucial so that the overlay multicast system is guaranteed that subscribers will receive one or more layers that are completely intact. When an occasional packet in a high priority layer is missed, it is repaired. However, the receiver may decide not to attempt to recover missing packets from low priority layers that are missing due to network congestion. Trying to repair these layers would require additional bandwidth, resulting in additional packet loss. Yet, as more end-to-end bandwidth becomes available, the receiver detects this and repairs additional layers, so more intact layers are delivered to the application.

Figure 8B:
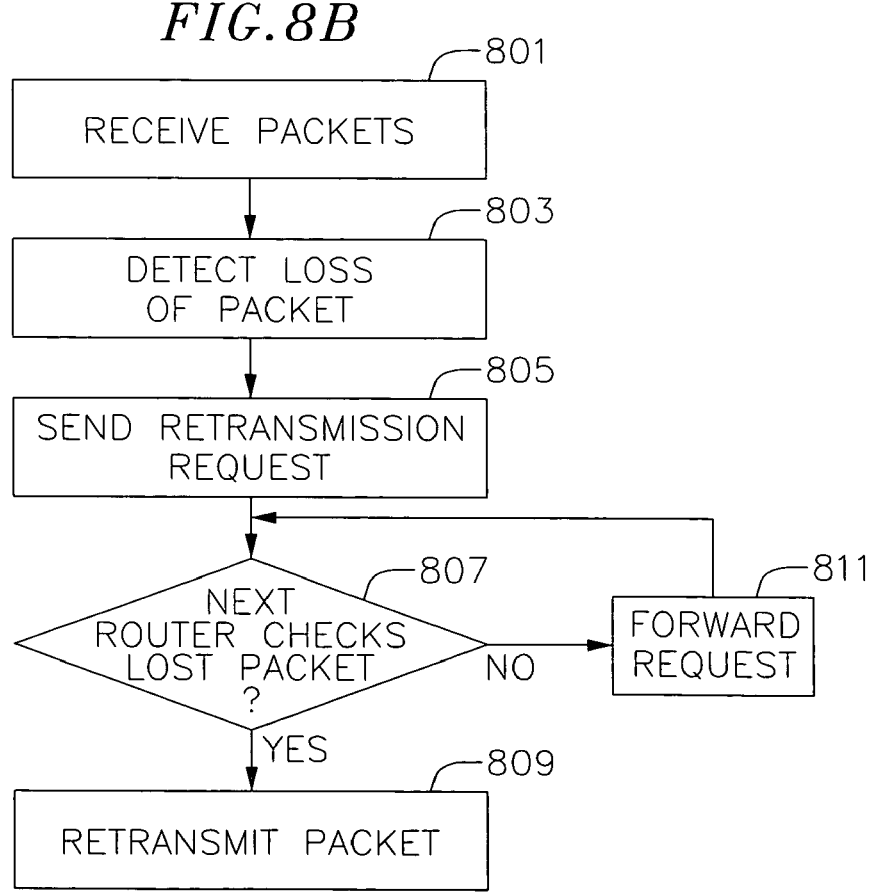
FIG. 8B is a flowchart of one embodiment of a process for handling layer repair.

FIG. 8B is a flowchart of one embodiment of a process for handling layer repair. In one embodiment, the overlay multicast system supports a receiver-side multicast socket that receives the raw packets from the multicast stream and is in charge of repairing damaged stream layers before forwarding them to the user application (block 801). This method includes a retransmission request packet. When the receiver detects a missing packet in a layer that should be repaired (block 803), it sends a retransmission request for this packet towards the source (block 805).

In one embodiment, detecting packet loss is done in the conventional way by sequencing each packet with an incrementing number. In another embodiment, each layer has its own sequence number, so all packets in one layer are sequenced independent of the other layers. This way, packet loss is detected in each layer, regardless of the conditions and packet loss in other layers.

To avoid a cascade of retransmission requests when a packet is dropped close to the source, a tree-based negative acknowledgment is used. This technique provides localized repair without communication with the source, because an intermediate router that has a copy of the requested data packet responds by sending it again and suppressing the retransmission request. When the next router closer in the distribution tree receives the retransmission request it checks its buffer to determine if the requested packet is still stored therein (block 807). If the requested packet is there, it is retransmitted (block 809). If the packet is not in the buffer then the retransmission request is forwarded to the next router in the distribution tree toward the source (block 811).

In one embodiment, when layers are dropped due to congestion, the programming API that is exposed to user applications notifies the user by means of an exception or special return value when it is reading packets. These notifications may not be fatal and only serve to inform the user that the quality of the stream has changed.

In one embodiment, localized repair works by having each router daemon store a window of transmitted packets. Packets are either stored for a fixed period of time, after which they are discarded, or a fixed amount of buffer space is reserved to store the most recently forwarded packets. Since the overlay multicast network by default use reliable connections between router daemons, packets never get lost while they are in transit between nodes. The only place where packets are purposely discarded is in the interface buffer interceptors. Thus, there is no need to buffer packets that were actually transmitted over the reliable connection, as those packets are guaranteed to have reached the neighbor node. In one embodiment, a router daemon copies packets to its retransmission packet store before those packets reach a buffer interceptor that discards packets.

The router's buffer interceptors copy packets to be stored for retransmission. In one embodiment, localized packet repair in the overlay multicast system are implemented by adding an interceptor to both interceptor pipelines of each interface and letting those interceptors simply store a copy of each packet. Additionally, when a retransmission request passes through the router on its way to the multicast source, the interceptor inspects the request packet and if it has the requested packet in its temporal packet store, it does not forward the retransmission request to the next interceptor. The requested data packet is injected into the network again.

Figure 9A:
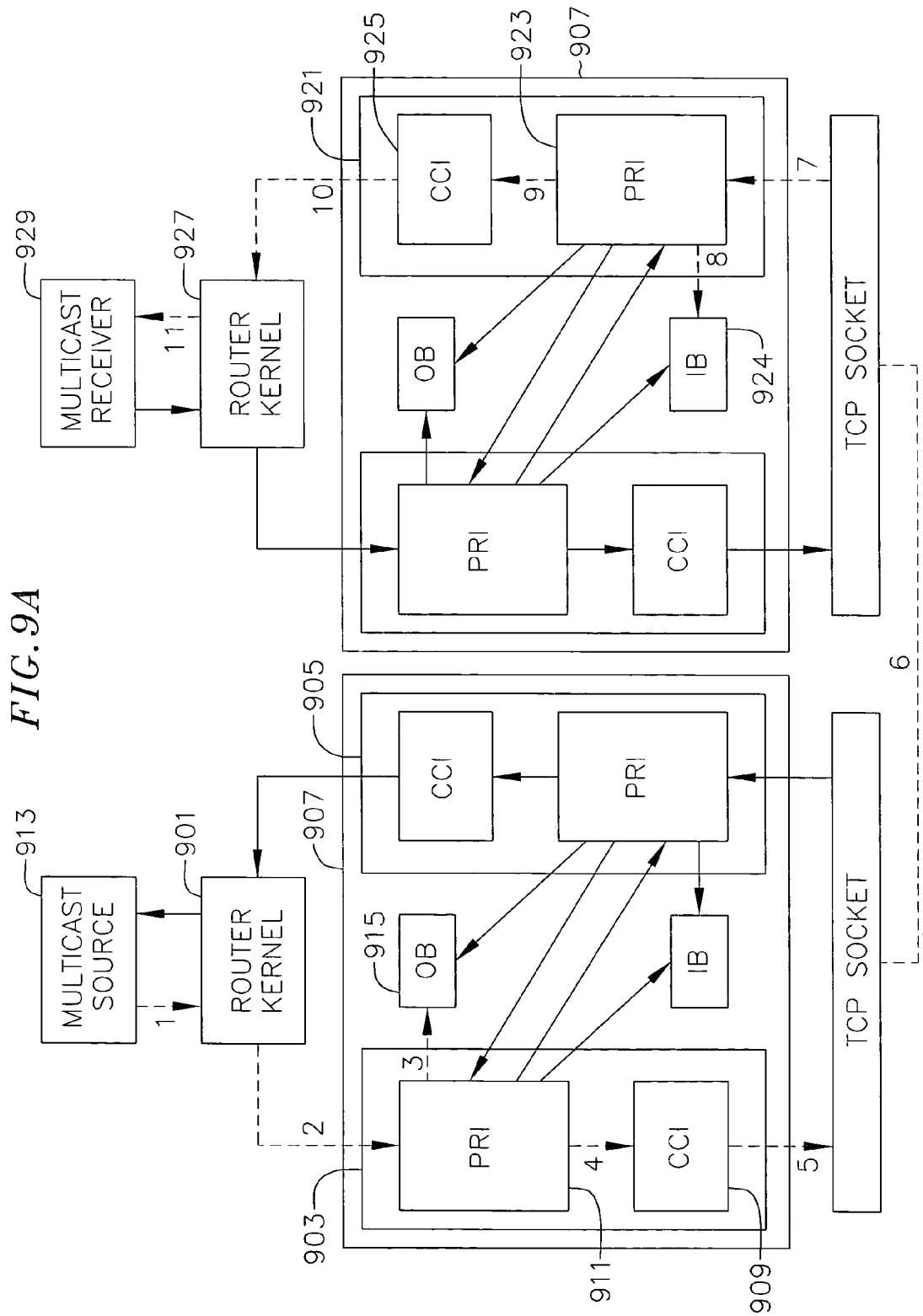
FIG. 9A is a diagram of two router daemons connected by a link.

FIG. 9A is a diagram of two router daemons connected by a link. There are two interceptor pipelines 903, 905 inside each interface 907. Each interface contains both an outbound 903 and an inbound 905 interceptor pipeline. The latter processes packets received from the network, while the outbound pipeline processes packets just before they leave the router daemon. In one embodiment, the pipelines contain two different interceptors; the CCI (Congestion Control Interceptor) 909 and the PRI (Packet Retransmission Interceptor) 911. In another embodiment, a router daemon contains additional interceptor instances per pipeline.

The CCI 909 implements bandwidth allocation rules and is responsible for discarding packets. During normal operation the source 913 publishes its multicast packet stream to its router daemon 901 (path 1) that sends the packets to all interfaces that lead to interested receivers according to the multicast routing table. In the present example, the packets are passed to the first outbound interceptor (PRI) of the interface (path 2). The PRI is responsible for storing a copy of each recoverable packet that is transmitted. It stores the copies in the private temporary packet store 915 of its interface (path 3). Then the interceptor passes the packets to the next interceptor (CCI) (path 4) where it is buffered until the connection link with the adjacent router daemon has time to transfer it.

In one embodiment, if the packets are not dropped in the outboard CCI, they are received by the neighbor router daemon (paths 5 and 6) and sent through that router's inbound interceptor pipeline 921 (path 7). They first enter the PRI 923 (path 7), which stores copies in its inbound buffer 924 (path 8) and then passes them on to the next interceptor (CCI) 925 (path 9) where they are temporarily parked until the router's kernel 927 thread picks them up (path 10) and delivers the packets to the subscribed multicast tsocket which forwards them to their next destination 929 (path 11).

Figure 9B:
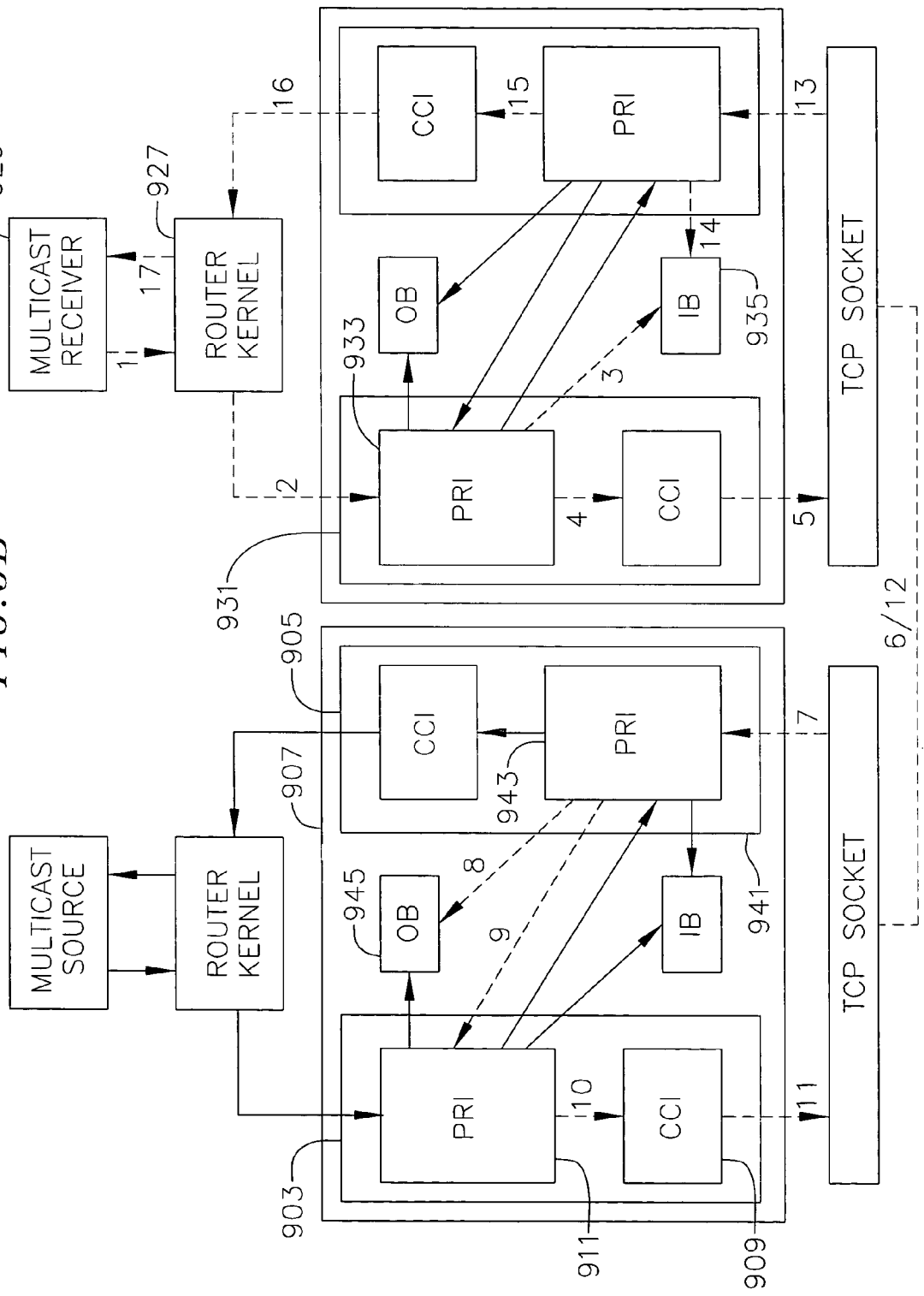
FIG. 9B is a diagram of two router daemons connected by a link where a retransmission is requested.

FIG. 9B is a diagram of two router daemons connected by a link where a retransmission is requested. If a packet is lost in the outbound packet interceptor pipeline of the source router because the connection between the routers was not fast enough to transmit all the packets, the receiving tsocket notices the loss and send a retransmission request (path 1). The destination address of this unicast retransmission request packet is that of the multicast group. The network packet switching kernels recognize the retransmission packets and use the multicast group to route the packet towards the source of the group. The retransmission request packet of the example passes the router kernel 927 and reaches the outbound packet interceptor pipeline 931 and goes into the PRI 933 (path 2). This interceptor scans specifically for retransmission requests and tries to answer them locally. To this end it inspects the packet, looks up the multicast group, the stream layer identifier and the layer's sequence number and then checks the inbound packet buffer 935 to see if it contains the packet (path 3). If this is not the case, the packet is passed on to the rest of the interceptors (path 4) and eventually transmitted to the adjacent router (paths 5 and 6) where it is fed to the inbound interceptor pipeline 941 (path 7).

In one embodiment, the PRI 943 checks the interface's outbound packet buffer 945 (path 8) and finds the multicast packet that was dropped by the congested outbound CCI 909 earlier. It is then re-inserted into the outbound packet stream via the outbound PRI 911 (path 9). The retransmission request packet is then dropped and not forwarded any further. Assuming the packet is not dropped again, it travels the normal way towards the receiver (paths 10, 11, 12, 13). In one embodiment, the receiver's PRI sees the multicast packet for the first time and stores a copy in its outbound packet buffer (path 14). The packet then continues on to destination 929 (paths 15, 16, 17). This mechanism of unicast retransmission packets and interceptors that offer localized repair is flexible in the way that not all router daemons need to support local packet repair. A router that does not support it simply forwards the requests and lets the upstream routers handle them. The network as a whole becomes more efficient when more routers support it.

In one embodiment, the PRI 943 checks the interface's outbound packet buffer 945 (path 8) and finds the multicast packet that was dropped by the congested outbound CCI 909 earlier. It is then re-inserted into the outbound packet stream via the outbound PRI 911 (path 9). The retransmission request packet is then dropped and not forwarded any further. Assuming the packet is not dropped again, it travels the normal way towards the receiver (paths 10, 11, 12, 13). In one embodiment, the receiver's PRI sees the multicast packet for the first time and stores a copy in its outbound packet buffer (path 14). The packet then continues on to destination 929 (paths 15, 16, 17). This mechanism of unicast retransmission packets and interceptors that offer localized repair is flexible in the way that not all router daemons need to support local packet repair. A router that does not support it simply forwards the requests and lets the upstream routers handle them. The network as a whole becomes more efficient when more routers support it.

In one embodiment, the central packet store eliminates duplicate packets by storing each packet only once and by keeping reference tables that point to packets for every interface. When an interface buffer stores a new packet in the central store, while that same packet was already stored by another interface, the central packet store merely adds a pointer to that packet instance to the interface's packet reference table.

In one embodiment, each entry in the reference tables has a time-out attached to it. This is to ensure packets are only temporarily stored. In one embodiment, the same packet could pass different interfaces at different times. The time-outs are not attached to the packets in the central store but rather to the packet references in the interface reference tables. In one embodiment, packets are only expunged from the central store when all references to the packet have timed out. Another optimization that can substantially reduce the amount of required storage space is to only store packets that were explicitly discarded by the Congestion Control Interceptors (CCIs) because of bandwidth constraints. Storing other packets has little value, as those are guaranteed to have arrived at the next router. No retransmissions may be requested for them unless some non deterministic packet loss occurs as a result of a crashing node.

In one embodiment, if a packet was lost close to the multicast source and because of this and all receivers simultaneously send a retransmission request, the upstream routers still apply conventional negative acknowledgement "nack" suppression techniques to combine all concurrent retransmission requests from its child links into a single request that is forwarded upstream towards the source. Applying local packet stores at every router reduces the latency of packet recovery.

In one embodiment, time to live values are adjustable per router, set system wide or similarly configured. A short time-out minimizes storage requirements, but will also lead to more overhead towards the source as more retransmission requests need to be propagated further upstream. Large time-outs will be more tolerant to late retransmissions, but require more storage. When a time-out of 60 seconds is used by the routers that means a lost packet can still be recovered after a minute. However, when the data stream contains real-time data such as stock quotes, such a delay in delivery cannot be tolerated. Problems get worse if the data packets also have to be delivered to the user applications in their original order. In that case the user does not receive any data for up to a minute while the missed packet is recovered and all newer packets are waiting for it. In one embodiment, a ten second timeout setting is utilized.

If all routers in the network use the same time-out value, there is no use in propagating these requests as the upstream routers are likely to have purged their copies as well. To avoid nack-implosions from slow receivers right after a packet is purged, each router interface remembers which packets it has purged. When a retransmission request is received for such a packet, the interface may respond by sending a special packet to the receiver that indicates that the requested packet had timed-out and cannot be recovered anymore. The retransmission request in this scenario is not propagated further upstream. When a receiver gets this time-out notification, it knows it will not have to wait any longer for the missed packet. It will notify the user application of the fact that data was lost and continue to deliver the next packets. Whether or not an application can tolerate packet loss will depend on the type of content. Audio and video will usually not be severely impacted by the loss of an occasional packet, while real-time stock quotes become dangerous to use when it is not known what quote was lost.

In one embodiment, where layered multicast is combined with localized packet retransmission, a service is realized that applies packet recovery only to those layers that can be delivered with the current bandwidth capacity. When the network has insufficient resources to deliver all layers of a stream, it is beneficial if the receivers know this and will not attempt to repair all missed packets from all layers. Instead, the receivers may use a mechanism that provides them feedback about the current network capacity and use that to decide for which layers it will recover missed packets. The algorithm monitors the status of the total stream and from this information derives how many layers of the stream can be reliably delivered to the user without stressing the network. It then marks these layers as being intact, reliable or similarly labeled and sends retransmission requests when an occasional packet is lost from these layers.

In one embodiment, the algorithm only delivers packets from the reliable layers to the application, but not before they have been put back into their original global order. In order for the algorithm to decide which layers are safely marked as intact, it requires some status information about the reception of the stream as a whole as well as the network conditions. To provide this, every packet contains the number of the most recent packet from all other layers or similar sequence data. Aside from carrying its own sequence number, each packet contains the current sequence number of all the other layers as well. By inspecting these sequence numbers each time a packet arrives, the receiver determines whether it has missed any packets from the layers it marked as reliable. If that is the case, these packets may be recovered. Each time a missed packet is detected, a countdown timer is started for it. If the packet is recovered before the time-out expired, the timer is canceled and removed.

If however the timer manages to expire, the layer is considered impossible to repair and may be, together with all higher reliable layers (lower in priority), removed from the list of reliable layers. How long the time-out interval should be can be application or content dependent. The interval determines how long delay is tolerated by the user. Setting the interval to a low value means a temporary congestion may corrupt a layer long enough to cause the receivers to drop it. Since packets occasionally get lost when unicast routing tables converge, changing the shape of multicast distribution trees, or when a router crashes that had pending packets in its interface buffers, appropriate time-out values are adjustable by an administrator according to network conditions to be found experimentally.

In a overlay multicast network that uses packet prioritization, routers explicitly introduce out of order delivery when a burst of packets queues in the outbound interceptor pipeline of a router interface with a slow connection. The time-out may be large enough to allow for this. Setting the time-out to a long period makes the stream much more resilient to congestion, but also increases the time for the receiver to discover that a layer must be dropped due to bandwidth constraints. Until congestion is finally detected, delivery of the previously received packets that causally depend on missed packets is postponed. Starting timers when packet loss is detected allows for congestion detection. However, it cannot be used to guarantee low end-to-end latency.

When no packets are lost and all are received according to their global order, the receiver cannot measure the total transmission delay. As such, a receiver cannot distinguish between an idle and a crashed source. In one embodiment, aside from removing layers from the reliable-list, the algorithm is also able to detect when more bandwidth becomes available and new higher layers can be added to this list, so that a higher quality stream can be delivered to the user. This is done by passively or actively monitoring the layers that are not currently in the reliable-list and not under repair. Every time a packet is received from these layers, this fact is stored for a period that is equal to the repair time-out discussed earlier. When a packet from a layer is received with a sequence number that shows that a packet has been lost from a higher layer that is not in the reliable-list, no retransmission request is sent, but the fact that this packet should have been received is recorded and stored for the same repair time-out period.

If during the time-out period the packet is received after all, possibly because it was delayed by a router, the stored record is marked as received. Because the state of each packet from every layer is recorded, the overlay multicast system builds a packet arrival history that is used to determine whether the reception quality was high enough to add a higher layer to the reliable-list and repair any further packet loss. In the overlay multicast system the reception history or similar data may be used to calculate a moving average that describes the amount of packet loss over the last x seconds, where x is equal to the repair timeout. With a small moving average history, the receiver will quickly respond to increased network capacity, while a longer history will only add layers when the network's capacity was sufficiently high for a longer period of time. The receiver may keep track of the reception quality of each layer by inspecting the list of sequence number that is attached to each data packet.

This causality information adds overhead to each packet, linearly related to the number of layers used in the stream. For example, when sequence numbers are 32 bits and the publisher uses all 256 available layers, each packet comes with a kilobyte of causality information, which contributes to at least 12.5% for an 8 Kb packet that is filled to the brim. To ease layer administration in the receiver socket, an overlay multicast stream only supports a static number of layers. When a publisher binds a multicast group address for reliable, layered communication, it may explicitly specify the number of layers that will be used.

In one embodiment, by default, packets are delivered to the user application in their original order. Not only are the packets inside the individual layers restored to their natural order using their sequence numbers, but the total ordering across the layers may also be restored. When the source sends three packets with different priority (each in a different layer), all three are received by the user application in the exact same order. A prioritized, layered packet is described as $P_{1\ (9,4,6)}$ where 1 represents the packet's priority or layer, 9 the sequence number of the last packet of layer 0 (the highest priority layer) that was sent at the time this packet was published, 4 represents the sequence number of this packet and 6 represents the sequence number of the last packet of layer 2. Also, the packet tells that the stream uses 3 layers in total: layer 0 up to and including layer 2. It is concluded that this packet causally depends on packet 9 from layer 0 and packet 6 from layer 2 and will only be delivered to the user application after those packets have been delivered. In another embodiment, the overlay multicast system does not reorder the packets, but may leave this task to the application using the network.

FIG. 10 is a diagram that shows one embodiment of a process of selective packet repair and ordering. For purposes of explanation the notation {0 (9,2,6); 1(9,3,6), . . . } to describe a sequence of packets where $P_{0(9,2,6)}$ was sent prior to $P_{1(9,3,6)}$, is used for sake of convenience. The first segment 1001, shows the sequence of packets originally published by the source. It reads from left to right, so $P_{0(9,2,6)}$ was published first, followed by $P_{1(9,3,6)}$, etc. In this example the source has published eight packets, divided over three priority levels or layers (0, 1 and 2, where 0 is 0 is the lowest layer with the highest priority). The second segment 1003 shows the packet stream as received by one of the subscribers. It shows two lost packets and an incorrect ordering. Before the packets are delivered to the user application, they are stored in internal buffers during the repair and reordering process. This state is depicted in segment 1005. Here the packets are in separate buffers, each representing a layer. The packets are ordered inside the buffers. The illustration shows the missing packets $P_{1(9,4,7)}$ and $P_{2(9,4,8)}$.

If the receiver currently only has layers 0 and 1 in its reliable-list, it will attempt to repair the hole in layer 1 by sending a retransmission request. Note that if the given sequence was just a snapshot of a running stream, the receiver would have detected the missing packet $P_{1(9,4,7)}$ when $P_{0(10,4,8)}$ was received, because this packet says it depends on packet #4 from layer 1. So even before $P_{1(10,5,9)}$ from layer 1 was received in our example, the receiver already detected loss in layer 1and immediately scheduled a repair timeout for the missing packet and sent a retransmission request. In fact, if it is assumed that the receiver had received packet #2 from layer 1prior to our snapshot of FIG. 10, then the conclusion would be that packet #4 as well as packet #3 were lost.

In the example, shortly after $P_{0(10,4,8)}$ was received, packet $P_{1(9,3,6)}$ is received. The receiver places the delayed packet in the appropriate receiver buffer and cancels the repair time-out it started earlier when it detected that the packet was missing. This is illustrated in segment 1007. Note that the hole in layer 2 may also be detected when $P_{0(10,4,8)}$ is received, as that packet claims to be sent after packet #8 of layer 2 was published, so either packet #8 from layer 2 got lost in the network, or was delayed. However, since layer 2 is not in the reliable-list, a retransmission request is not sent. However, as for all packets, a timer is started for packet #8 of layer 2. When the user application is ready to read packets, the algorithm returns only packets from layers that are in the reliable-list. Even though some of the layer 2packets were received, they are discarded and not delivered. The resulting stream of packets that is delivered to the user is equal to the stream originally published by the source, with all layer 2 packets removed.

In this example, despite the fact that the network has insufficient capacity, having dropped packets from every layer and delivered the packets out of order, the user received a deterministic subset of the stream that is uncorrupted. Because the overlay multicast system sources are live data streams that cannot slow down or pause and because real-time data are not buffered by the source too long, receivers will only attempt to recover lost packets for a limited period of time. Whether a packet is received, recovered or lost, its buffer slot will be freed after this timeout, resulting in a natural size limit of the receive buffer. How large the buffer can get is related to the average speed of the stream and the length of the repair time-out.

In one embodiment, the algorithm implementation does not enforce a hard size limit during packet repairs. A more troublesome situation occurs when the user application does not read data from the socket fast enough. When this happens, the amount of pending data builds up in the socket and both storage requirements and the transmission delay increases. In one embodiment, this may be handled by removing a layer from the reliable-list, causing those packets to be discarded from the buffers, while decreasing the amount of data that is delivered to the application. If a clean feedback algorithm that can keep the number of layers in balance with the application's reading speed is not used, the overlay multicast system throws a fatal exception to the user or provide a similar indicator to the user application and close the socket when the receive buffer reaches a certain maximum size, or when the total time between arrival of packets and their actual delivery reaches a threshold.

Although restoring the original global packet ordering before delivering the data to the user application is assumed to be appropriate for most types of data, there is content for which each packet invalidates all previous packets. This is the case for stock quotes and similar time sensitive data. For example, when a new stock quote update is received for a financial ticker symbol, it renders the previous updates useless. For most applications that process real-time financial data, only the most recent information is interesting. When global ordering is restored, the algorithm will postpone the delivery of the most recent data until all prior packets have been received also. For a typical application, such as a market data terminal, that merely displays quote updates to the screen, this postponing adds little value. When the burst of pending updates is finally delivered by the tsocket, the application updates the symbol's last value on the screen, thereby leaving only the last and most recent update visible and overwriting all pending updates immediately.

In one embodiment, because the reordering process adds additional delay to the data delivery, it can be switched off by applications that do not benefit from it. Without reordering, global (causal relations between packets from different layers) and local ordering (order of individual packets inside a single layer) is ignored and packets are delivered to the application immediately after they have been received. Disabling reordering has no impact on the reliability. Lost or delayed packets may still be recovered for all layers in the reliable-list, only the recovered packets may be delivered with additional delay. Whether or not this makes them useless is up to the application to decide.

For example, with market data it is useful to know whether an update is older or newer than the one previously received. This is because a stock quote may be overwritten by a newer one, but not the other way around. In this case, the source could add a logical time stamp or similar sequence indicator to each stock quote, so the receiver can decide how to handle the update. In one embodiment, aside from configuring a layered multicast tsocket to restore global ordering or no ordering at all, a receiver can configure a tsocket to only restore local ordering. Whether or not this is useful will depend on the type of application and the content, but it offers the advantage that delivery of packets from lower (high priority) layers are not delayed during recovery of packets from higher, lower priority layers.

In one embodiment, an example market data publishing application tracks market financial updates in a linked list or similar data structure. Every time a new update is received, it is stored in the appropriate slot, overwriting the previous update. This way, the linked list always contains the most recent trade for every symbol. A virtual token traverses the list at a fixed speed. If the stream is to be thinned to one update per second, the token will visit one slot every second. When the token visits a slot, it removes the quote update and forwards it, leaving an empty slot. Empty slots will be skipped by the token without any delay. When one of the symbols has two updates per second in the incoming stream, the second incoming update after the last visit of the token will overwrite the update pending in the slot and the older pending update is dropped. This allows the leaky bucket algorithm to always provide the thinned clients with the most recent, live update of every symbol. While the virtual token visits the slots that have a recent quote update pending to be sent out, a thread receives the incoming market data stream and inserts new trades in the slots. To limit the outgoing transmission rate to one quote per second, the token thread sleeps for one second after it moved and sent an update from a slot. When the token is able to complete one full circle between two incoming updates of every symbol, there will be no data loss. Instead of limiting the outgoing bandwidth to a fixed maximum, the dequeuing thread could also be configured to run as fast as possible, relying on external feedback such as a blocking write call from the network, to reduce publishing speed. This could be particularly useful when the algorithm is used on the server side of a point-to-point TCP connection to a client application. In one embodiment, the server uses the algorithm to send the data at original speed, until network saturation slows down the links. A potential problems with this technique is that the original order of the updates is lost. In fact, when every symbol updates more than once while the token circles the list, the token will find every slot filled with a quote update, causing the order of the output stream to match the fixed order of the slots in the linked list. For quote updates from different symbols, this is usually not a problem, as they are not related to each other.

In another embodiment, an alternative algorithm may be used that provides another way of thinning a stream of data, such as live market data, with varying bandwidth to a fixed maximum rate, without the risk of providing stale data, for example stale market symbols. This algorithm may be used to produce enhancement layers that form a layered data stream, such as a layered market data stream. One example method of doing this is to have several instances of the algorithm running that each receive a copy of the input stream, letting their token run at different speeds and tagging their updates with a layer number. The layers may then be combined into a single stream. Unfortunately, this may introduce redundant information in the stream because the higher layers contain updates that are also available in the lower layers. This technique of encoding an entire stream in different qualities and sending them to clients concurrently to meet their individual bandwidth capacities may be referred to as simulcasting.

In one embodiment, the thinning algorithm may be modified to have each layer contain only information that is not already present in the lower layers, thereby eliminating redundancy among the layers. To achieve this the leaky bucket algorithm may be extended to a multi-level ring as illustrated in FIG. 11B, creating a virtual cylinder of vertically stacked, circular lists, where each ring represents a layer of the output stream. Each ring has its own token. In one embodiment, the tokens all circulate their ring at the same speed. In other embodiments, the tokens in each ring may be set to circulate at different speeds. This data structure also identifies columns. A column is the collection of vertically stacked slots that can all store an update for the same symbol.

Figure 11A:
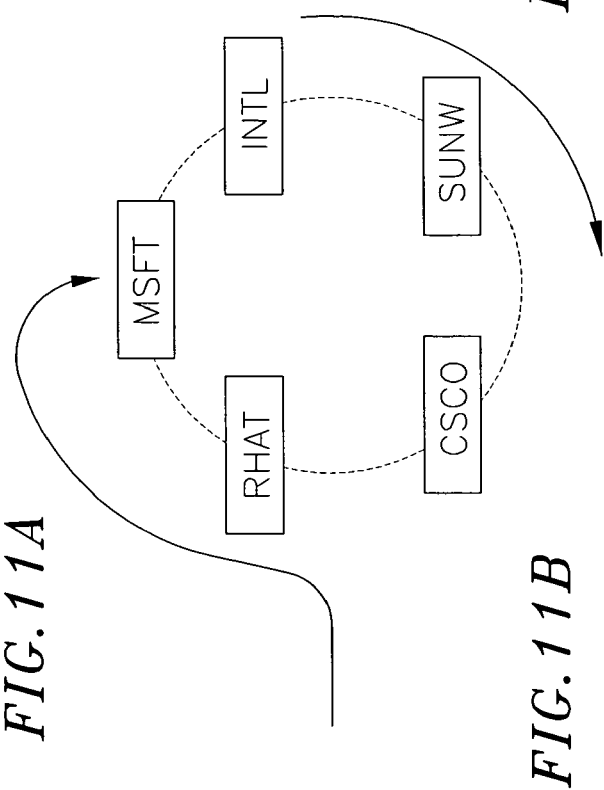
FIG. 11A is a diagram showing thinning of a stream of data.
Figure 11C:
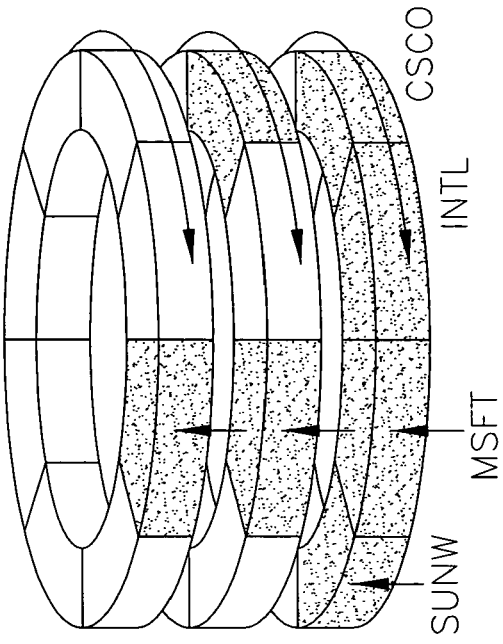
FIG. 11C is a diagram of a multi-level token ring structure showing thinning of data.
Figure 11B:
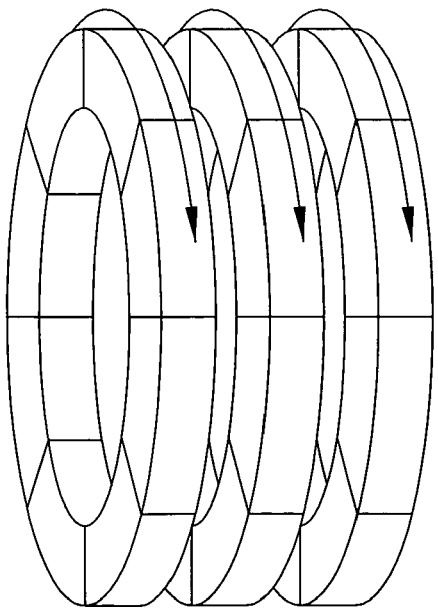
FIG. 11B is a diagram of a multi-level token ring structure.

FIG. 11A is a diagram of an example method of thinning a stream of live market data. The gray slots represent symbols for which a recent quote update was received, while the transparent slots are empty. FIG. 11B is a diagram illustrating the token ring data structure. Multiple instances of the thinning algorithm and data structure may be conceived as being vertically stacked, each instance represents a stream layer and each symbol has a column that can store more than one update. FIG. 11C is a diagram of one embodiment of a representation of the stacked thinning algorithm of FIG. 11A at work. In the example, the gray slots contain a pending quote update, while the transparent slots are empty. The illustration shows how the updates of a volatile symbol are spread out over several higher layers.

In one embodiment, the thinning algorithm has a single input thread that receives the original stream. Newly received updates may be inserted in the lowest ring. If a new update arrives for a slot in the lowest ring that already contains an update for that symbol, this older update is vertically shifted into the next ring, so that the lower slot can always store the latest update. Once an update is shifted upwards, it cannot return to a lower ring anymore, even if all other slots beneath it were emptied.

In one example embodiment, symbols that have more than one trade during the time it takes the token to complete a full rotation of the ring will be spread out to two or more higher layers, while symbols that have very infrequent trades will only occupy a single slot in the bottom ring. An example result of this process is depicted in FIG. 11C. FIG. 11C shows the thinning algorithm using three layers to thin a market data stream that contains updates for eight symbols. Four symbols are included in data structure and assigned to the four visible columns in the front. The figure also shows that all four symbols have pending updates in the bottom ring, while the 'MSFT' symbol is so volatile that it shifted updates into all three layers before the tokens could dequeue any of the pending updates.

In a case where a symbol is so actively traded that it manages to shift an update out of the top ring, that update is irrecoverably lost. If required, loss of updates can be avoided by letting the token in the top ring run without dequeuing delay, letting it empty every slot immediately after an update was queued. The result is that the transmission rate of the upper layer will equal the transmission rate of the original stream, minus the combined rate of all lower layers. Because the transmission rate of the lower layers may have a fixed maximum, the upper layer's rate may fluctuate and follow the variations of the original stream.

In one embodiment, if the tokens all rotate at the same speed, this does not imply that they visit the same symbol slots at the same time. Instead, they will usually be at different positions in their ring. This is a result of empty slots that are skipped without waiting.

In one embodiment, the layered thinning algorithm has out of order transmission and may cause additional delay. Every ring can contain an update for the same symbol at a certain time and because the tokens can have different column locations inside their ring, it is undefined which ring will dequeue and transmit its update first, which will be second and so on. This means that not only the order of symbols is shuffled, but even the updates for a single symbol are no longer guaranteed to be transmitted chronologically.

While new updates for a symbol are queued, shifted and sent out, in some cases an update can survive in the rings substantially longer than its younger successors. This can occur when an update that is just about to be dequeued by the token, gets shifted to the next layer by a more recent update that entered through the lower ring. In this case it is likely that the more recent update is dequeued sooner than the older update that now has to wait for the token of its new ring to reach its slot. To address this issue, the system provides a way of putting the outgoing, layered updates back in the original, chronological order. This is done by labeling incoming updates with sequential numbers and having the tokens pass their dequeued, labeled updates to a transmit window that uses the sequence numbers to restore the chronological order. When updates are shifted out of the upper ring and therefore considered lost the transmit window is notified not to wait for their sequence numbers.

When applying order reconstruction across all rings, the transmit window must have the same capacity as all rings combined, $size_{tw} = N \cdot j$, where $size_{tw}$ is the maximum capacity of the transmit window, N the number of symbols in the original stream (and therefore the number of slots per ring) and j the number of layers used. The potential size of the transmit window, together with its bursty behavior when a delayed quote update releases a substantial amount of pending updates from the window, may justify a mechanism that applies order reconstruction to achieve chronologic transmission per symbol only, similar to the output of the base layer encoder.

Like the algorithm depicted in FIG. 11A, the layered system introduces delay. The model is essentially a collection of instances of the first algorithm, thus, its worst case delay is the sum of each ring's worst case delay:

$$t_{max} = \sum_{i=0}^{j} \frac{N}{f_{update}(i)}$$

where $t_{max}$ is the maximum delay in seconds that the algorithm could introduce for a single quote update, N the number of symbols in the original stream, j the number of used layers and $f_{update}(i)$ the update frequency of the token in layer i.

In the foregoing specification, the invention has been described with reference to specific embodiments thereof. It will however, be evident that various modification and changes can be made thereto without departing from the broader spirit and scope of the invention as set forth in the appended claims. The specification and drawings are, accordingly, to be regarding in an illustrative rather than a restrictive sense.

What is claimed is:

1. A method comprising:
   receiving data from a source in a single stream;
   storing a sequence vector of a packet within the packet on an accessible storage device, wherein the sequence vector includes:
   a layer identifier indicating a relative location of the packet within a hierarchy of virtual layers, and
   a packet identifier of a most recently received packet in each virtual layer in the stream, the layer identifier further indicating an importance of the packet, wherein the importance of the packet reflects a priority of the packet and influences a probability that the packet is selected to be dropped;
   forwarding the data to multiple concurrent receivers over a packet switched network via a network interface;
   updating a reliable list of virtual layers based on the received data and the sequence vector of the packet;
   detecting, by a processor in communications with the accessible storage device, inadequate bandwidth to transmit the stream to a destination; and
   selecting a virtual layer of high priority packets from the hierarchy of virtual layers in the stream to forward to the destination based on the layer identifier and the reliable list.

2. The method of claim 1, wherein the data is live.

3. The method of claim 2, further comprising:
   guaranteeing timely delivery of the data to the multiple concurrent receivers.

4. The method of claim 3, wherein the packet-switched network includes nodes with insufficient bandwidth.

5. The method of claim 1, further comprising:
   labeling each packet in each virtual layer with an incrementing sequence number.

6. The method of claim 5, further comprising:
   tracking a most recently used sequence number for each virtual layer.

7. The method of claim 1, further comprising:
   inspecting the sequence vector in a packet to detect packet loss in a virtual layer.

8. The method of claim 1, further comprising:
   dividing available bandwidth among a plurality of data streams, wherein a network router prioritizes forwarding of high priority virtual layers.

9. The method of claim 1, further comprising:
   initiating a countdown timer for each missing packet within a virtual layer; and
   sending a retransmission request to the source for each missing packet within the virtual layer.

10. The method of claim 1, further comprising:
    delivering packets in an original order; and
    maintaining a buffer to temporarily queue packets from a virtual layer to wait for a less recent missing packet to be retransmitted.

11. The method of claim 1, further comprising: marking a virtual layer as irrecoverable if a countdown timer has run out for a packet in the virtual layer.

12. The method of claim 1, further comprising:
    receiving a request from a destination for a packet from a virtual layer; and
    retransmitting the packet to the destination.

13. The method of claim 12, further comprising:
    forwarding the request toward the source after searching a local buffer for a copy of the packet and determining that packet is not found locally.

14. The method of claim 1, further comprising:
    selecting a virtual layer of lower priority packets in the stream to forward if sufficient bandwidth is available to the destination.

15. The method of claim 1, further comprising:
    discarding duplicate retransmission requests upon receipt.

16. The method of claim 1, wherein packets are stored in a central data structure accessible to receivers over a packet switched network.

17. The method of claim 16, wherein the central data structure stores a pointer to a unique packet within the central data structure.

18. The method of claim 1, wherein a packet delivery time causally depends on a receipt of packets referenced in the sequence vector.

* * * * *